US012763672B2

(12) United States Patent
Cui et al.

(10) Patent No.: US 12,763,672 B2
(45) Date of Patent: Oct. 13, 2026

(54) PFC CIRCUIT, PFC APPARATUS, POWER MODULE, AND INTEGRATED INDUCTOR

(71) Applicant: HUAWEI DIGITAL POWER TECHNOLOGIES CO., LTD., Shenzhen (CN)

(72) Inventors: Yanjin Cui, Shenzhen (CN); Jijian Zhao, Shenzhen (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 202 days.

(21) Appl. No.: 18/899,773

(22) Filed: Sep. 27, 2024

(65) Prior Publication Data

US 2025/0112544 A1 Apr. 3, 2025

(30) Foreign Application Priority Data

Sep. 28, 2023 (CN) ......................... 202311289844.8

(51) Int. Cl.
*H02M 1/42* (2007.01)
*H01F 27/24* (2006.01)
(Continued)

(52) U.S. Cl.
CPC ......... *H02M 1/4208* (2013.01); *H02M 7/219* (2013.01); *H01F 27/24* (2013.01);
(Continued)

(58) Field of Classification Search
CPC .... H02M 1/0064; H02M 1/42; H02M 1/4208; H02M 1/4225; H02M 1/4233; H02M 7/219; H01F 27/24
See application file for complete search history.

(56) References Cited

U.S. PATENT DOCUMENTS 10,217,559 B2 2/2019 Yang et al.
2017/0294833 A1* 10/2017 Yang .................. H01F 27/2804
(Continued)

FOREIGN PATENT DOCUMENTS

CN 204808997 U 11/2015
CN 210925704 U 7/2020
CN 113345693 A 9/2021

OTHER PUBLICATIONS

Lee et al., “Next Generation of Power Supplies-Design for Manufacturability,” IEEE Journal of Emerging and Selected Topics in Power Electronics, Jun. 16, 2020, 9(6):6462-6475.
(Continued)

*Primary Examiner* — Gary A Nash
(74) *Attorney, Agent, or Firm* — Fish & Richardson P.C.

(57) ABSTRACT

One example power factor correction (PFC) circuit includes S first bridge arms, a second bridge arm, and a voltage stabilization capacitor that are connected in parallel, and the PFC circuit further includes an integrated inductor. The integrated inductor includes a magnetic core, S first windings, and S second windings. Second ends of the S first windings are respectively connected to midpoints of the S first bridge arms. A second end of a balancing unit formed by the S second windings are connected to a midpoint of the second bridge arm. The magnetic core includes M+1 first magnetic yokes sequentially arranged in parallel. The S first windings and the S second windings are disposed in spaces formed by any two adjacent first magnetic yokes. Two adjacent first magnetic yokes corresponding to the S first windings are the same, and two adjacent first magnetic yokes corresponding to the S second windings are the same.

18 Claims, 11 Drawing Sheets

(51) Int. Cl.
*H02M 1/00* (2007.01)
*H02M 7/219* (2006.01)

(52) U.S. Cl.
CPC ........ *H02M 1/0064* (2021.05); *H02M 1/4225* (2013.01); *H02M 1/4233* (2013.01)

(56) References Cited

U.S. PATENT DOCUMENTS

2020/0412272 A1* 12/2020 Raimann ................. H02M 7/23
2022/0310303 A1* 9/2022 Wang .................. H02M 3/1586

OTHER PUBLICATIONS

Wang et al., PCB-Based Magnetics Integration and Common-Mode Noise Suppression for A High-Frequency PFC. Proceedings of 2023 IEEE Applied Power Electronics Conference and Exposition (APEC), Mar. 19, 2023, pp. 2043-2049.
Extended European Search Report in European Appln. No. 24203149.0, mailed on Jan. 29, 2025, 15 pages.

* cited by examiner

PFC CIRCUIT, PFC APPARATUS, POWER MODULE, AND INTEGRATED INDUCTOR

CROSS-REFERENCE TO RELATED APPLICATION

This application claims priority to Chinese Patent Application No. 202311289844.8, filed on Sep. 28, 2023, which is hereby incorporated by reference in its entirety.

TECHNICAL FIELD

This application relates to the field of power electronics technologies, and in particular, to a PFC circuit, a PFC apparatus, a power module, and an integrated inductor.

BACKGROUND

With gradual application of a third generation wide-bandgap semiconductor power device, a switch-mode power supply develops towards higher power density, a higher switching frequency, and ultra-high efficiency. The switch-mode power supply may include a power factor correction (PFC) circuit. The PFC circuit can improve a ratio of effective power to apparent power of an alternating current input to the switch-mode power supply, increase a power factor, and reduce harmonic content. When a power device in the switch-mode power supply works, a switching frequency is high. This easily causes high-speed voltage and current changes, and serious common-mode noise is generated through distributed capacitance (also referred to as parasitic capacitance) of a system to the ground. This deteriorates performance of the switch-mode power supply. Therefore, a measure needs to be taken to suppress the common-mode noise.

A method for suppressing common-mode noise is to insert a common-mode filter network between an input alternating current power supply and a power device. However, when a large common-mode inductance is required in the common-mode filter network, it is difficult to design a common-mode inductor because a printed circuit board (PCB) has a limited area.

SUMMARY

This application provides a PFC circuit, a PFC apparatus, a power module, and an integrated inductor, to reduce an occupied board area while suppressing common-mode noise of the PFC circuit.

According to a first aspect, this application provides a power factor correction PFC circuit, including S first bridge arms, a second bridge arm, a voltage stabilization capacitor, and an integrated inductor. The S first bridge arms, the second bridge arm, and the voltage stabilization capacitor are connected in parallel. The integrated inductor includes a magnetic core, S first windings, and S second windings. First ends of the S first windings are all configured to connect to a first end of an alternating current power supply, and second ends of the S first windings are respectively connected to midpoints of the S first bridge arms. The S second windings form a balancing unit. A first end of the balancing unit is configured to connect to a second end of the alternating current power supply, and a second end of the balancing unit is connected to a midpoint of the second bridge arm. S may be an integer greater than or equal to 1. The magnetic core in the integrated inductor includes M+1 first magnetic yokes sequentially arranged in parallel. The S first windings and the S second windings are disposed in spaces formed by any two adjacent first magnetic yokes of the M+1 first magnetic yokes. Two adjacent first magnetic yokes corresponding to a space in which the S first windings are located are the same, and two adjacent first magnetic yokes corresponding to a space in which the S second windings are located are the same. In addition, one of the two adjacent first magnetic yokes corresponding to the space in which the S first windings are located is different from the two adjacent first magnetic yokes corresponding to the space in which the S second windings are located, and M may be an integer greater than or equal to 2. In other words, the space in which the S first windings are located is different from the space in which the S second windings are located.

In this application, when the PFC circuit is mounted on a printed circuit board PCB, a $1^{st}$ first magnetic yoke of the M+1 first magnetic yokes in the integrated inductor is configured to connect to the PCB, and the M+1 first magnetic yokes are arranged in parallel along a direction. The direction is perpendicular to a surface that is of the PCB and on which the PFC circuit is mounted, and the S first windings and the S second windings in the integrated inductor are respectively located in the spaces formed by the two groups of two adjacent first magnetic yokes. In this way, when the S first windings and the S second windings in the integrated inductor are all connected to the PFC circuit of the foregoing structure, positions occupied by the S first windings on the PCB overlap positions occupied by the S second windings on the PCB. An area occupied by the integrated inductor on the PCB is approximately equal to an area of the $1^{st}$ first magnetic yoke. In comparison with S discrete first inductors and S discrete second inductors directly disposed in the PFC circuit, the S first windings and the S second windings in this application can reduce a board area occupied by the PFC circuit, reduce material costs, and improve product power density.

With reference to the first aspect, in a feasible implementation, each of the S first bridge arms includes two high-frequency switches connected in series. Each of the second bridge arm includes two low-frequency switches connected in series. A switching frequency of the high-frequency switch is greater than a frequency of the alternating current power supply, and a switching frequency of the low-frequency switch is equal to the frequency of the alternating current power supply. Herein, each high-frequency switch and each low-frequency switch may be an IGBT, a MOSFET, gallium nitride (GaN), silicon carbide (SIC), or the like. In this application, each inductor (for example, the S first windings), the voltage stabilization capacitor, each high-frequency switch, and each low-frequency switch in the PFC circuit work together, so that distortion of a current waveform can be improved, a phase difference between a voltage and a current can be reduced, and a power factor can be increased.

According to a second aspect, this application further provides a power factor correction PFC circuit, including a rectifier unit, S PFC branches, a filter capacitor, and an integrated inductor. The integrated inductor includes a magnetic core, S first windings, and S second windings. Herein, S may be an integer greater than or equal to 1. Each of the S PFC branches includes one first winding in the S first windings, a diode, and a first switch. The diode and the first switch in each PFC branch are connected in series and then connected in parallel to the filter capacitor. A first end of the first winding in each PFC branch is connected to a first output end of the rectifier unit, and a second end of the first winding in each PFC branch is connected to a point at which the diode and the first switch in the PFC branch are connected in series. The S second windings form a balancing unit. A first end of the balancing unit is connected to a second output end of the rectifier unit, and a second end of the balancing unit is connected to a point at which the filter capacitor and the first switch are connected. The magnetic core in the integrated inductor includes M+1 first magnetic yokes sequentially arranged in parallel. The S first windings and the S second windings are disposed in spaces formed by any two adjacent first magnetic yokes of the M+1 first magnetic yokes. Two adjacent first magnetic yokes corresponding to a space in which the S first windings are located are the same, and two adjacent first magnetic yokes corresponding to a space in which the S second windings are located are the same. In addition, one of the two adjacent first magnetic yokes corresponding to the space in which the S first windings are located is different from the two adjacent first magnetic yokes corresponding to the space in which the S second windings are located, and M may be an integer greater than or equal to 2. In other words, the space in which the S first windings are located is different from the space in which the S second windings are located.

In this application, when the PFC circuit is mounted on a printed circuit board PCB, a $1^{st}$ first magnetic yoke of the M+1 first magnetic yokes in the integrated inductor is configured to connect to the PCB, and the M+1 first magnetic yokes are arranged in parallel along a direction. The direction is perpendicular to a surface that is of the PCB and on which the PFC circuit is mounted, and the S first windings and the S second windings in the integrated inductor are respectively located in the spaces formed by the two groups of two adjacent first magnetic yokes. In this way, when the S first windings and the S second windings in the integrated inductor are all connected to the PFC circuit of the foregoing structure, positions occupied by the S first windings on the PCB overlap positions occupied by the S second windings on the PCB. An area occupied by the integrated inductor on the PCB is approximately equal to an area of the $1^{st}$ first magnetic yoke. In comparison with S discrete first inductors and S discrete second inductors directly disposed in the PFC circuit, the S first windings and the S second windings in this application can reduce a board area occupied by the PFC circuit, reduce material costs, and improve product power density.

With reference to the first aspect or the second aspect, in a feasible implementation, when S is greater than or equal to 2, the balancing unit includes the S second windings that are sequentially connected in series. In this way, the balancing unit formed by the S second windings may be considered as a total inductor, and a proper impedance may be provided for the PFC circuit, so that common-mode noise of the PFC circuit is reduced, and EMI is optimized.

With reference to the first aspect or the second aspect, in a feasible implementation, inductances of the S first windings are the same, and inductances of the S second windings are the same. One of the S first windings corresponds to one phase in the PFC circuit. The S first windings with a same inductance and the S second windings with a same inductance are disposed, so that common-mode noise of the PFC circuit can be suppressed, and EMI can be optimized.

With reference to the first aspect or the second aspect, in a feasible implementation, M is greater than or equal to 3, and the integrated inductor further includes S third windings. Two adjacent first magnetic yokes corresponding to a space in which the S third windings are located are the same. One of the two adjacent first magnetic yokes corresponding to the space in which the S third windings are located is different from the two adjacent first magnetic yokes corresponding to the space in which the S first windings are located. One of the two adjacent first magnetic yokes corresponding to the space in which the S third windings are located is different from the two adjacent first magnetic yokes corresponding to the space in which the S second windings are located. A quantity of turns of the third winding meets any one of the following: The quantity of turns of the third winding is different from a quantity of turns of the first winding; the quantity of turns of the third winding is different from a quantity of turns of the second winding; and the quantity of turns of the third winding is different from the quantity of turns of the first winding and the quantity of turns of the second winding. In this way, the third winding may be used as a backup winding. When the inductance of the first winding is inappropriate, the third winding with a more appropriate inductance may be used to replace the first winding, and the third winding is connected to the PFC circuit, to suppress common-mode noise of the PFC circuit. Alternatively, when the inductance of the second winding is inappropriate, the third winding with a more appropriate inductance may be used to replace the second winding, and the third winding is connected to the PFC circuit, to suppress common-mode noise of the PFC circuit.

With reference to the first aspect or the second aspect, in a feasible implementation, the magnetic core further includes M*N magnetic cylinders and P second magnetic yokes arranged in parallel, where N is an integer greater than or equal to S, P is an integer greater than or equal to 1, and a difference between N and P is less than or equal to 1.

The P second magnetic yokes are all perpendicular to the M+1 first magnetic yokes, and are disposed between the $1^{st}$ first magnetic yoke and a last first magnetic yoke of the M+1 first magnetic yokes. Each of the P second magnetic yokes is in communication with the $1^{st}$ first magnetic yoke and the last first magnetic yoke.

N magnetic cylinders are disposed in a layer of space formed by any two adjacent first magnetic yokes of the M+1 first magnetic yokes, and each of the N magnetic cylinders in each layer of space is in contact with two adjacent first magnetic yokes corresponding to the layer of space. The N magnetic cylinders in each layer of space are all parallel to the P second magnetic yokes, and the N magnetic cylinders in each layer of space and the P second magnetic yokes are alternately arranged.

One winding is disposed on each of the M*N magnetic cylinders.

In this application, magnetic fluxes generated by windings disposed on two adjacent magnetic cylinders in a same layer of space cancel on a second magnetic yoke between the two magnetic cylinders. Therefore, currents in windings on magnetic cylinders in a same layer of space do not affect each other, and windings on different magnetic cylinders in the same layer of space are not coupled. Magnetic fluxes generated by two windings respectively located in an upper layer of space and a lower layer of space of a same first magnetic yoke cancel on the first magnetic yoke. Therefore, the two windings respectively located in the upper layer of space and the lower layer of space of the same first magnetic yoke are not coupled. This can simplify circuit control logic. In addition, effect of connecting the two groups of windings in the integrated inductor in the PFC circuit is same as effect of disposing two groups of discrete inductors in the PFC circuit. A board area occupied by the PFC circuit can be reduced, and common-mode noise of the PFC circuit can be suppressed.

According to a third aspect, this application further provides a power factor correction PFC apparatus, including a printed circuit board and the PFC circuit according to the first aspect, any possible implementation of the first aspect, the second aspect, or any implementation of the second aspect. The PFC circuit is connected to the printed circuit board. The M+1 first magnetic yokes in the integrated inductor are arranged in parallel along a first direction, the first direction is perpendicular to a first surface of the printed circuit board, the M+1 first magnetic yokes are all parallel to the first surface, and the first surface is used for mounting the PFC circuit.

According to a fourth aspect, this application further provides a power module, including a direct current DC/DC converter and the PFC circuit according to the first aspect, any possible implementation of the first aspect, the second aspect, or any implementation of the second aspect. An output end of the PFC circuit is connected to an input end of the DC/DC converter.

The DC/DC converter is configured to perform DC/DC conversion based on a direct current voltage provided by the PFC circuit.

In this application, an apparatus like a PFC apparatus or the power module includes the PFC circuit. The PFC circuit includes an integrated inductor. The integrated inductor may provide two groups of windings connected to the PFC circuit to suppress common-mode noise of the PFC circuit. The integrated inductor includes M+1 first magnetic yokes arranged in parallel, the two groups of windings are respectively located in spaces formed by two groups of two adjacent first magnetic yokes, and positions occupied by the two groups of windings on the PCB connected to the PFC circuit overlap. Therefore, a board area occupied by the PFC circuit can be reduced. The PFC circuit is used in the apparatus like the power module and the PFC apparatus, so that common-mode noise can be suppressed, product energy density can be improved, EMI can be optimized, and working efficiency can be improved.

According to a fifth aspect, this application further provides an integrated inductor, including a magnetic core and M*N windings. The magnetic core includes M+1 first magnetic yokes, P second magnetic yokes, and M*N magnetic cylinders. M is an integer greater than or equal to 2, both N and P are integers greater than or equal to 1, and a difference between N and P is less than or equal to 1.

The M+1 first magnetic yokes are sequentially arranged in parallel. The P second magnetic yokes are all perpendicular to the M+1 first magnetic yokes, and are arranged in parallel between a 1$^{st}$ first magnetic yoke and a last first magnetic yoke of the M+1 first magnetic yokes. Each of the P second magnetic yokes is in communication with the 1$^{st}$ first magnetic yoke and the last first magnetic yoke.

N magnetic cylinders are disposed in a layer of space formed by any two adjacent first magnetic yokes of the M+1 first magnetic yokes, and each of the N magnetic cylinders in each layer of space is in contact with two adjacent first magnetic yokes corresponding to the layer of space. The N magnetic cylinders in each layer of space are all parallel to the P second magnetic yokes, and the N magnetic cylinders in each layer of space and the P second magnetic yokes are alternately arranged.

The M*N windings are respectively disposed on the M*N magnetic cylinders.

With reference to the fifth aspect, in a feasible implementation, N is an integer greater than or equal to 2, and N is greater than P.

The N magnetic cylinders in each layer of space and the P second magnetic yokes are alternately arranged, so that any two adjacent magnetic cylinders in the N magnetic cylinders in each layer of space are spaced apart by one of the P second magnetic yokes.

With reference to the fifth aspect, in a feasible implementation, N is an integer greater than or equal to 1, and Nis equal to P.

With reference to the fifth aspect, in a feasible implementation, N is an integer greater than or equal to 1, and N is less than P.

The N magnetic cylinders in each layer of space and the P second magnetic yokes are alternately arranged, so that any two adjacent second magnetic yokes in the P second magnetic yokes are spaced apart by one of the N magnetic cylinders in each layer of space.

With reference to the fifth aspect, in a feasible implementation, the 1$^{st}$ first magnetic yoke of the M+1 first magnetic yokes is configured to connect to the printed circuit board.

In this application, two groups of windings are integrated into a same integrated inductor, the two groups of windings are disposed in two different layers of spaces in the integrated inductor, and an arrangement direction of the two layers of spaces is perpendicular to a surface that is of a PCB and on which the integrated inductor is mounted. This can reduce a board area occupied by the integrated inductor, and reduce a space and costs. In addition, the integrated inductor is connected to a PFC circuit to suppress common-mode noise of the PFC circuit. This helps optimize EMI and improve product power density.

DESCRIPTION OF EMBODIMENTS

A PFC circuit provided in this application may be widely applied to various power supply products, such as a DC/DC conversion power supply in a photovoltaic scenario, a power supply used by a communication base station, a data center power supply, and a high-power industrial power supply.

Figure 1:
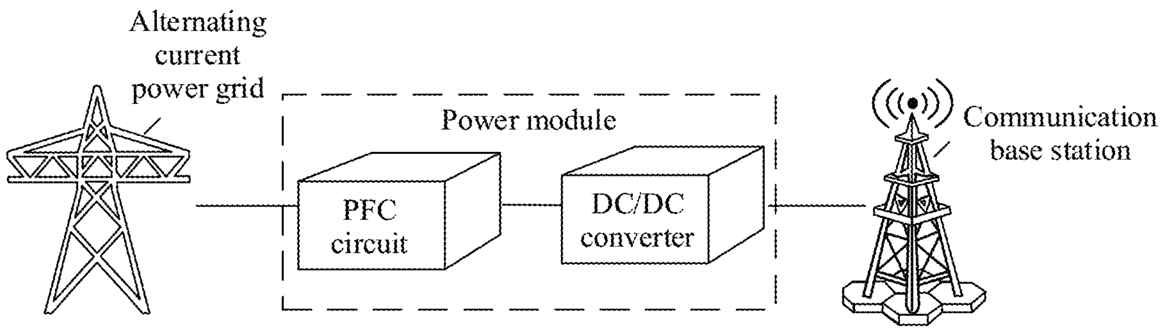
FIG. 1 is a diagram of an application scenario of a PFC circuit according to this application.

FIG. 1 is a diagram of an application scenario of a PFC circuit according to this application. As shown in FIG. 1, the PFC circuit and a direct current DC/DC converter may form a power module. An input end of the PFC circuit may be configured to connect to an alternating current power grid, an output end of the PFC circuit is connected to an input end of the DC/DC converter, and an output end of the DC/DC converter may be configured to connect to a power-consuming device. In this application scenario, an alternating current provided by the alternating current power grid is input to the PFC circuit, and the PFC circuit may perform power factor correction on the alternating current, and output a direct current voltage to the DC/DC converter. The DC/DC converter may perform DC/DC conversion on the direct current voltage, and output the direct current voltage to supply power to the power-consuming device. Herein, the DC/DC converter may include an LLC converter, a DAB converter, and the like. This is not limited in this application. In FIG. 1, an example in which the power module is a power supply used by a communication base station is used, and an example in which the power-consuming device is the communication base station is used. The foregoing is merely an example of the application scenario of the PFC circuit provided in this application, and is not exhaustive. The application scenario is not limited in this application. This application further provides a power module. The power module may include a PFC circuit and a DC/DC converter. The PFC circuit may be configured to connect to an alternating current power supply, and an output end of the PFC circuit is connected to an input end of the DC/DC converter. The power module may be applied to the scenario shown in FIG. 1.

When the PFC circuit is applied to various power supply products, the PFC circuit needs to be connected to a printed circuit board PCB. Therefore, this application further provides a PFC apparatus. The PFC apparatus includes a PFC circuit and a PCB. When the PFC circuit works, common-mode noise is easily generated, and electromagnetic interference (EMI) exists. Currently, the common-mode noise may be suppressed by adding a common-mode inductor to the PFC circuit. However, in this case, the PFC circuit occupies a large board area, and both common-mode noise suppression and product energy density improvement cannot be implemented. In the PFC apparatus provided in this application, the PFC circuit mounted on the PCB includes an integrated inductor. The integrated inductor includes M+1 first magnetic yokes sequentially arranged in parallel, and the M+1 first magnetic yokes are arranged in parallel along a first direction. The first direction is perpendicular to a first surface of the printed circuit board. Herein, the M+1 first magnetic yokes are all parallel to the first surface, and the first surface is used for mounting the PFC circuit. M is an integer greater than or equal to 2. In this way, the PFC circuit including the integrated inductor is mounted on the PCB, and the integrated inductor provides two groups of windings connected to the PFC circuit, so that the common-mode noise of the PFC circuit can be suppressed. In addition, the two groups of windings provided by the integrated inductor are respectively located in spaces formed by two groups of two adjacent first magnetic yokes, and positions occupied by the two groups of windings on the PCB overlap. Therefore, an area occupied by the integrated inductor on the PCB is basically an area of a surface that is of a first magnetic yoke and that is parallel to the PCB. In this way, in comparison with two groups of discrete inductors disposed in the PFC circuit, the two groups of windings in this application can greatly reduce a board area occupied by the PFC circuit, thereby implementing both common-mode noise suppression and product energy density improvement.

The following describes the PFC circuit provided in embodiments of this application by using examples with reference to FIG. 2 to FIG. 12.

Figure 2:
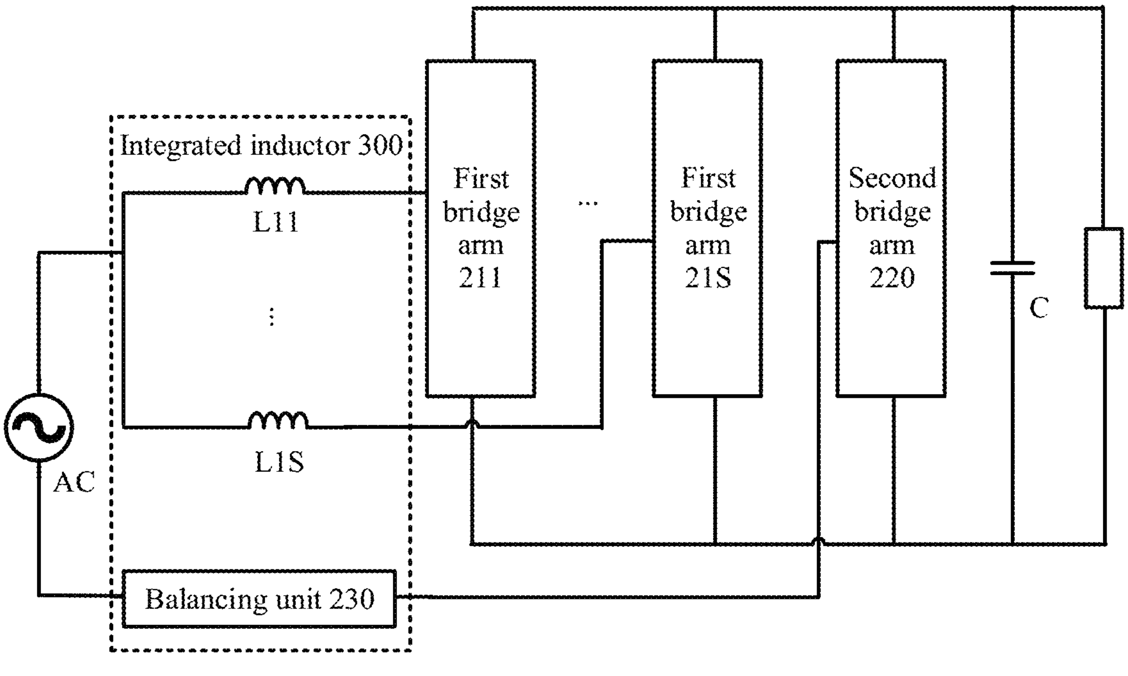
FIG. 2 is a diagram of a structure of a PFC circuit according to this application.

FIG. 2 is a diagram of a structure of a PFC circuit according to this application. As shown in FIG. 2, the PFC circuit includes S first bridge arms (for example, 211 to 21S in FIG. 2), a second bridge arm (for example, 220 in FIG. 2), a voltage stabilization capacitor (for example, a capacitor C in FIG. 2), and an integrated inductor (for example, 300 in FIG. 2). The S first bridge arms, the second bridge arm, and the voltage stabilization capacitor are connected in parallel. The integrated inductor includes a magnetic core, S first windings (for example, L11 to L1S in FIG. 2), and S second windings (which may be represented as L21 to L2S, and are not shown in FIG. 2). In the PFC circuit, first ends of the S first windings are all configured to connect to a first end of an alternating current power supply (for example, an AC in FIG. 2), and second ends of the S first windings are respectively connected to midpoints of the S first bridge arms. The S second windings form a balancing unit (for example, 230 in FIG. 2). A first end of the balancing unit is configured to connect to a second end of the alternating current power supply, and a second end of the balancing unit is connected to a midpoint of the second bridge arm. Herein, S may be an integer greater than or equal to 1. Two ends of the voltage stabilization capacitor may be used as an output end of the PFC circuit, and the output end of the PFC circuit may be configured to connect to a load (for example, a resistor R in FIG. 2). Alternatively, the load may be another element, for example, a DC/DC converter. In the PFC circuit, based on the balancing unit including the S second windings, common-mode noise of the PFC circuit can be suppressed, and EMI can be optimized.

In the PFC circuit, the magnetic core of the integrated inductor includes M+1 first magnetic yokes sequentially arranged in parallel. Herein, M may be an integer greater than or equal to 2. The S first windings and the S second windings are disposed in spaces formed by any two adjacent first magnetic yokes of the M+1 first magnetic yokes. Two adjacent first magnetic yokes corresponding to a space in which the S first windings are located are the same, and two adjacent first magnetic yokes corresponding to a space in which the S second windings are located are the same. In addition, one of the two adjacent first magnetic yokes corresponding to the space in which the S first windings are located is different from the two adjacent first magnetic yokes corresponding to the space in which the S second windings are located. For example, when the M+1 first magnetic yokes include a magnetic yoke A, a magnetic yoke B, and a magnetic yoke C, the S first windings may be disposed in a space formed by the magnetic yoke A and the magnetic yoke B, and the S second windings may be disposed in a space formed by the magnetic yoke B and the magnetic yoke C. For another example, when the M+1 first magnetic yokes include a magnetic yoke A, a magnetic yoke B, a magnetic yoke C, and a magnetic yoke D, the S first windings may be disposed in a space formed by the magnetic yoke A and the magnetic yoke B, and the S second windings may be disposed in a space formed by the magnetic yoke C and the magnetic yoke D.

When the PFC circuit is mounted on a printed circuit board PCB, a 1st first magnetic yoke of the M+1 first magnetic yokes in the integrated inductor is configured to connect to the PCB, and the M+1 first magnetic yokes are arranged in parallel along a first direction. The first direction is perpendicular to a first surface of the PCB, and the first surface is a surface used by the PCB for mounting the PFC circuit. In this case, when the S first windings and the S second windings in the integrated inductor are all connected to the PFC circuit shown in FIG. 2, positions occupied by the S first windings on the PCB overlap positions occupied by the S second windings on the PCB. An area occupied by the integrated inductor on the PCB is approximately equal to an area of the 1st first magnetic yoke. In comparison with S discrete first inductors and S discrete second inductors directly disposed in the PFC circuit, the S first windings and the S second windings in this application can reduce a board area occupied by the PFC circuit, reduce material costs, and improve product power density.

In some feasible implementations, when S is greater than or equal to 2, the balancing unit includes the S second windings that are sequentially connected in series. In this case, in the PFC circuit shown in FIG. 2, the balancing unit 230 may include the second winding L21, . . . , and the second winding L2S that are sequentially connected in series. When S is equal to 1, the balancing unit may include the second winding L21. The balancing unit formed by the S second windings may be considered as a total inductor, and a proper impedance may be provided for the PFC circuit, so that the common-mode noise of the PFC circuit is reduced, and the EMI is optimized.

Figure 3:
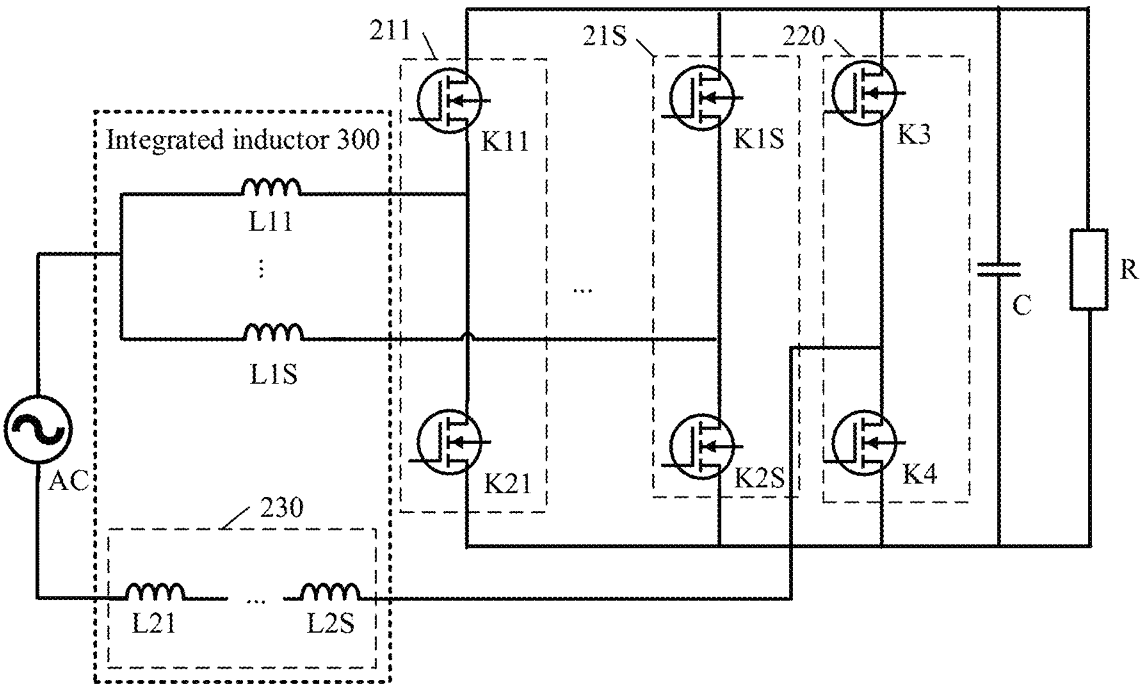
FIG. 3 is a diagram of another structure of a PFC circuit according to this application.

FIG. 3 is a diagram of another structure of a PFC circuit according to this application. In comparison with the PFC circuit shown in FIG. 2, each of S first bridge arms of the PFC circuit shown in FIG. 3 includes two high-frequency switches connected in series. For example, a first bridge arm 211 includes a switch K11 and a switch K21 connected in series, . . . , and a first bridge arm 21S includes switches K1S and K2S connected in series. A second bridge arm of the PFC circuit shown in FIG. 3 includes two low-frequency switches connected in series. For example, a second bridge arm 220 includes a switch K3 and a switch K4 connected in series. A switching frequency of the high-frequency switch is greater than a frequency of an alternating current power supply, and a switching frequency of the low-frequency switch is equal to the frequency of the alternating current power supply. For example, when the frequency of the alternating current power supply is equal to a frequency of a power grid, the switching frequency of the low-frequency switch may be 50 Hz to 60 Hz, and the switching frequency of the high-frequency switch may be 100 kHz. The two low-frequency switches in the second bridge arm are turned on in a positive half cycle and a negative half cycle of the alternating current power supply, respectively, and an input voltage provided by the alternating current power supply may be rectified. The two high-frequency switches in the first bridge arm are switched at a high frequency, so that a current can be shaped while the voltage is increased. Each high-frequency switch and each low-frequency switch may be an insulated gate bipolar transistor (IGBT), a metal-oxide-semiconductor field-effect transistor (MOSFET), gallium nitride (GaN), silicon carbide (SiC), or the like, which may be specifically determined based on an actual application scenario. In the PFC circuit, each inductor (for example, the S first windings), a voltage stabilization capacitor, each high-frequency switch, and each low-frequency switch work together, so that distortion of a current waveform can be improved, a phase difference between a voltage and a current can be reduced, and a power factor can be increased.

In some feasible implementations, inductances of the S first windings are the same, and inductances of the S second windings are the same. As shown in FIG. 2 or FIG. 3, inductances of the first winding L11, . . . , and the first winding L1S are the same, and inductances of the second winding L21, . . . , and the second winding L2S are the same. Herein, when S is 1, the PFC circuit is a single-phase PFC circuit; when S is 2, the PFC circuit is a two-phase PFC circuit; and when S is 3, the PFC circuit is a three-phase PFC circuit, and the like. One first winding in the S first windings corresponds to one phase in the PFC circuit. S first windings with a same inductance are disposed, and S second windings with a same inductance are disposed, so that common-mode noise of the PFC circuit can be suppressed, and EMI can be optimized.

The following specifically describes a principle of suppressing common-mode noise by adding a balancing unit in the PFC circuit.

In the PFC circuit, a first capacitor exists between a midpoint of the first bridge arm and a reference ground. The first capacitor may actually include a Y capacitor, a parasitic capacitor, and the like. That is, the first capacitor may be an equivalent capacitor. A second capacitor exists between a midpoint of the second bridge arm and the reference ground. The second capacitor may actually include a Y capacitor, a parasitic capacitor, and the like. That is, the second capacitor may also be an equivalent capacitor. The first capacitor may be represented by Cd, and the second capacitor may be represented by Cb.

It can be learned from circuit analysis that the S first windings, the S second windings, S first capacitors, and the second capacitor in the PFC circuit may form a Wheatstone bridge. When the Wheatstone bridge is balanced, common-mode noise of the PFC circuit is not transmitted outside the PFC circuit, so that the common-mode noise of the PFC circuit can be effectively reduced, and EMI can be optimized. S may be an integer greater than or equal to 1. For different values of S, equations for Wheatstone bridge equilibria are different. Therefore, cases in which values of S are 2, 3, and 1 are described as examples respectively.

Figure 4:
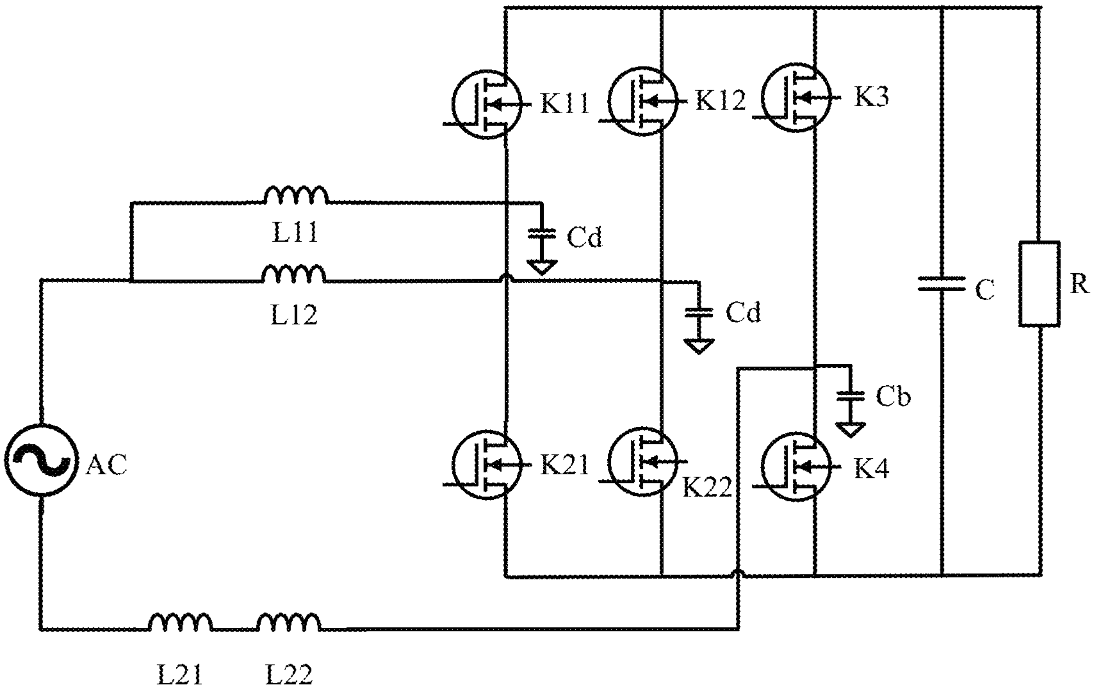
FIG. 4 is a diagram of still another structure of a PFC circuit according to this application.
Figure 5:
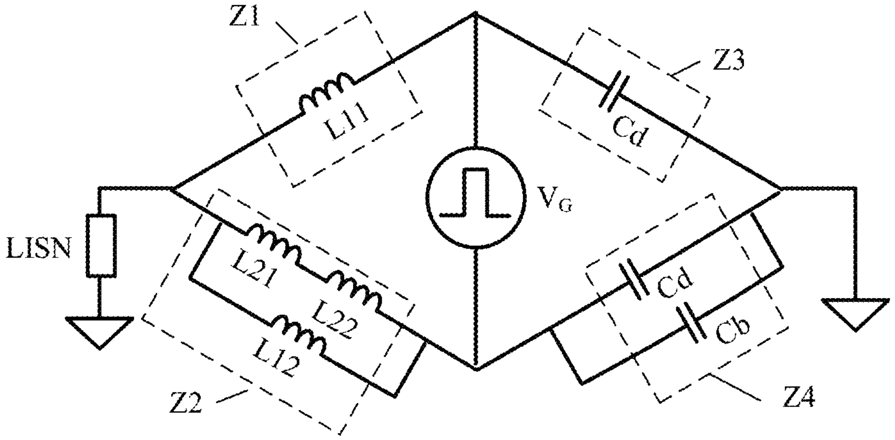
FIG. 5 is a diagram of a structure of a Wheatstone bridge equivalent to a PFC circuit according to this application.

When S is 2, the PFC circuit includes two first bridge arms and one second bridge arm, and an integrated inductor includes two first windings and two second windings. In this case, the PFC circuit is a two-phase interleaved bridgeless PFC circuit. A structure of the PFC circuit is shown in FIG. 4, and a Wheatstone bridge equivalently obtained by the PFC circuit is shown in FIG. 5. In FIG. 5, a line impedance stabilization network (LISN) is an auxiliary device in an electromagnetic compatibility test. The LISN is used to isolate electromagnetic wave interference, provide a stable test impedance, and filter signals. A galvanometer VG is used to detect whether there is a current between two bridge arms. In the PFC circuit, when impedances Z1, Z2, Z3, and Z4 of four bridge arms of the Wheatstone bridge meet the following relationship (1), the Wheatstone bridge is balanced, and the PFC circuit has the minimum common-mode noise.

$$Z1/Z3 = Z2/Z4 \quad (1)$$

In the PFC circuit, impedances of the four bridge arms of the Wheatstone bridge and the first winding, the second winding, the first capacitor, and the second capacitor in the PFC circuit meet the following relationship (2):

$$Z1 = Z_{L11},\ Z2 = Z_{(L21+L22)\|L12},\ Z3 = Z_{Cd},\ Z4 = Z_{Cd\|Cb} \quad (2)$$

Figure 6:
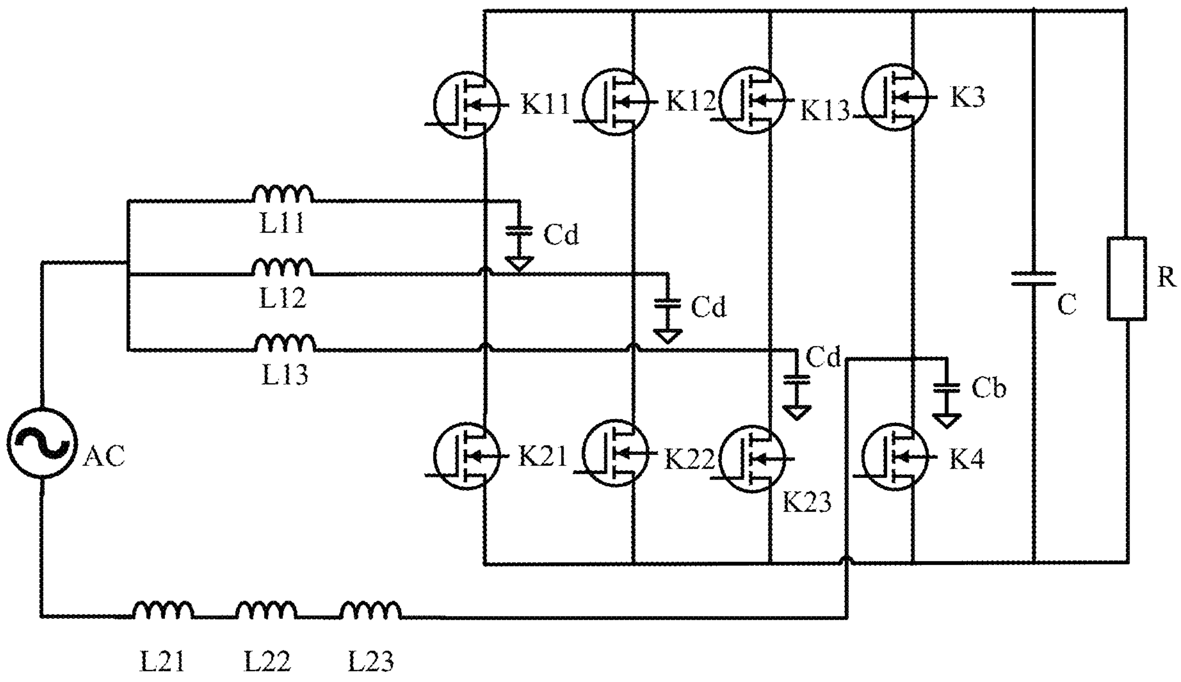
FIG. 6 is a diagram of still another structure of a PFC circuit according to this application.

When S is 3, the PFC circuit includes three first bridge arms and one second bridge arm, and the integrated inductor includes three first windings and three second windings. In this case, the PFC circuit is a three-phase interleaved bridgeless PFC circuit. A structure of the PFC circuit is shown in FIG. 6. In a Wheatstone bridge equivalently obtained by the PFC circuit, when impedances Z1, Z2, Z3, and Z4 of four bridge arms of the Wheatstone bridge meet the foregoing relationship (1), the Wheatstone bridge is balanced, and the PFC circuit has the minimum common-mode noise.

In the PFC circuit, the impedances of the four bridge arms of the Wheatstone bridge and the first winding, the second winding, the first capacitor, and the second capacitor in the PFC circuit meet the following relationship (3):

$$Z1 = Z_{L11},\ Z2 = Z_{(L21+L22+L23)\|L12\|L13},\ Z3 = Z_{Cd},\ Z4 = Z_{Cd\|Cd\|Cb} \quad (3)$$

Figure 7:
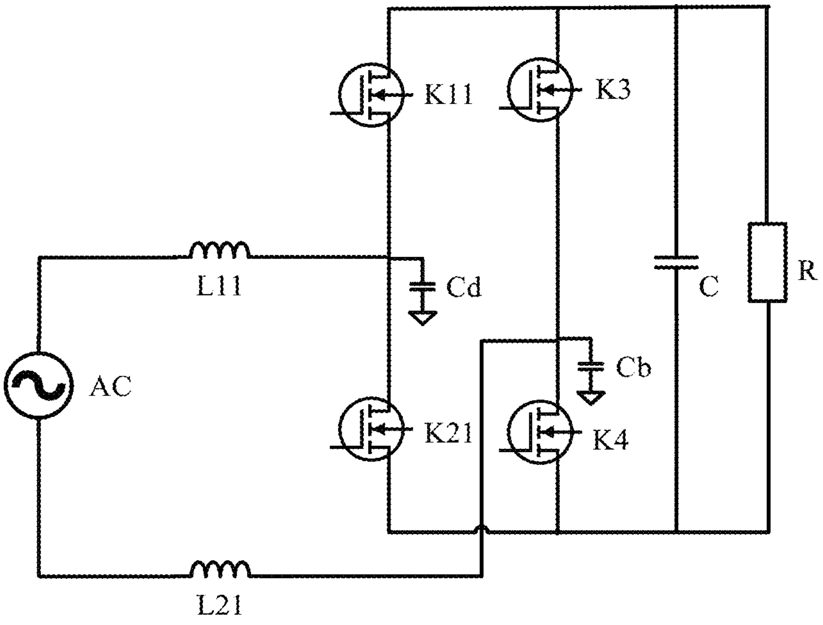
FIG. 7 is a diagram of still another structure of a PFC circuit according to this application.

When S is 1, the PFC circuit includes one first bridge arm and one second bridge arm, and the integrated inductor includes one first winding and one second winding. In this case, the PFC circuit is a non-interleaved bridgeless PFC circuit. A structure of the PFC circuit is shown in FIG. 7. In a Wheatstone bridge equivalently obtained by the PFC circuit, when impedances Z1, Z2, Z3, and Z4 of four bridge arms of the Wheatstone bridge meet the foregoing relationship (1), the Wheatstone bridge is balanced, and the PFC circuit has the minimum common-mode noise.

In the PFC circuit, the impedances of the four bridge arms of the Wheatstone bridge and the first winding, the second winding, the first capacitor, and the second capacitor in the PFC circuit meet the following relationship (4):

$$Z1 = Z_{L11},\ Z2 = Z_{L21},\ Z3 = Z_{Cd},\ Z4 = Z_{Cb} \quad (4)$$

In this application, a balancing unit formed by the second winding is added to the PFC circuit including the first winding, that is, two groups of inductors with proper inductance values are disposed in the PFC circuit, so that a Wheatstone bridge equivalent to the PFC circuit is balanced, the common-mode noise of the PFC circuit can be suppressed, and EMI can be optimized.

In some feasible implementations, when M is greater than or equal to 3, the integrated inductor in the PFC circuit may further include S third windings. Two adjacent first magnetic yokes corresponding to a space in which the S third windings are located are the same, one of the two adjacent first magnetic yokes corresponding to the space in which the S third windings are located is different from two adjacent first magnetic yokes corresponding to a space in which the S first windings are located. In addition, one of the two adjacent first magnetic yokes corresponding to the space in which the S third windings are located is different from two adjacent first magnetic yokes corresponding to a space in which the S second windings are located. In this case, the S first windings, the S second windings, and the S third windings are respectively located in different spaces. For example, when the M+1 first magnetic yokes include a magnetic yoke A, a magnetic yoke B, a magnetic yoke C, and a magnetic yoke D, the S first windings may be located in a space formed by the magnetic yoke A and the magnetic yoke B, the S second windings may be located in a space formed by the magnetic yoke B and the magnetic yoke C, and the S third windings may be located in a space formed by the magnetic yoke C and the magnetic yoke D. Herein, inductances of the S third windings may be the same. Further, a quantity of turns of the third winding meets any one of the following: The quantity of turns of the third winding is different from a quantity of turns of the first winding; the quantity of turns of the third winding is different from a quantity of turns of the second winding; and the quantity of turns of the third winding is different from the quantity of turns of the first winding and the quantity of turns of the second winding. In this way, the third winding may be used as a backup winding. When an inductance of the first winding is inappropriate, the third winding with a more appropriate inductance may be used to replace the first winding, and the third winding is connected to the PFC circuit, to suppress common-mode noise of the PFC circuit. Alternatively, when an inductance of the second winding is inappropriate, the third winding with a more appropriate inductance may be used to replace the second winding, and the third winding is connected to the PFC circuit, to suppress common-mode noise of the PFC circuit.

Optionally, the integrated inductor may further include S fourth windings, where M is greater than or equal to 4. The fourth windings, the third windings, the first windings, and the second windings are respectively located in different spaces. Similar to the third winding, the fourth winding may also be used as a backup winding. When inductances of the first winding and the second winding are inappropriate, the third winding and the fourth winding with more appropriate inductances may be used to replace the first winding and the second winding, and the third winding and the fourth winding are connected to the PFC circuit, to reduce the common-mode noise of the PFC circuit. It should be noted that the third winding and the fourth winding are merely examples, and windings used as backup windings in the integrated inductor may further include a fifth winding, a sixth winding, and . . . , which may be specifically determined based on factors such as an actual scenario requirement and costs. A quantity of backup windings is not limited in this application.

In this application, at least three groups of windings in different spaces are disposed in the integrated inductor, to provide a backup winding for the PFC circuit. When an element parameter in the PFC circuit changes, two groups of windings with proper inductance values can be provided to connect to the PFC circuit. In this way, the Wheatstone bridge equivalent to the PFC circuit can be balanced, the common-mode noise in the PFC circuit can be suppressed, and the EMI can be optimized. In addition, when a plurality of groups of windings are disposed in the integrated inductor, a board area occupied by the PFC circuit is not increased. In comparison with a plurality of groups of discrete inductors, the plurality of groups of windings can greatly reduce the occupied board area, and improve product power density.

In some feasible implementations, a magnetic core of the integrated inductor may further include M*N magnetic cylinders and P second magnetic yokes arranged in parallel, where N is an integer greater than or equal to S, P is an integer greater than or equal to 1, and a difference between N and P is less than or equal to 1. Herein, N may be greater than P by 1, N is equal to P, or N is less than P by 1. The P second magnetic yokes are all perpendicular to the M+1 first magnetic yokes, and are disposed between a 1st first magnetic yoke and a last first magnetic yoke of the M+1 first magnetic yokes. Each of the P second magnetic yokes is in communication with the 1st first magnetic yoke and the last first magnetic yoke. Herein, when the second magnetic yoke is in communication with the first magnetic yoke, magnetic induction lines generated by a winding may be transmitted from the second magnetic yoke to the first magnetic yoke in communication with the second magnetic yoke, or the magnetic induction lines are transmitted from the first magnetic yoke to the second magnetic yoke in communication with the first magnetic yoke, to create a condition for forming a closed loop for a transmission path of the magnetic induction lines of the winding.

N magnetic cylinders are disposed in a layer of space formed by any two adjacent first magnetic yokes of the M+1 first magnetic yokes in the integrated inductor, and each of the N magnetic cylinders in each layer of space is in contact with two adjacent first magnetic yokes corresponding to the layer of space. Herein, the magnetic cylinder is in contact with two adjacent first magnetic yokes, and may provide a transmission path for magnetic induction lines generated by a winding disposed on the magnetic cylinder, so that the magnetic induction lines can be transmitted in a closed loop. The N magnetic cylinders in each layer of space are all parallel to the P second magnetic yokes, and the N magnetic cylinders in each layer of space and the P second magnetic yokes are alternately arranged. One winding is disposed on each of the M*N magnetic cylinders. Herein, magnetic induction lines generated by a winding disposed on any magnetic cylinder in each layer of space pass through a second magnetic yoke adjacent to the magnetic cylinder, and do not pass through another magnetic cylinder in the layer of space. Magnetic fluxes generated by windings disposed on two adjacent magnetic cylinders in a same layer of space cancel on a second magnetic yoke between the two magnetic cylinders. Therefore, currents in windings on magnetic cylinders in a same layer of space do not affect each other, and windings on different magnetic cylinders in the same layer of space are not coupled. For example, a first winding L11 and a first winding L12 in the S first windings are not coupled, and a second winding L21 and a second winding L22 in the S second windings are not coupled. In this way, circuit control logic can be simplified. In addition, magnetic fluxes generated by two windings respectively located in an upper layer of space and a lower layer of space of a same first magnetic yoke cancel on the first magnetic yoke. Therefore, the two windings respectively located in the upper layer of space and the lower layer of space of the same first magnetic yoke are not coupled. For example, when S is 2, the first winding L11 is not coupled to the second winding L21, and the first winding L12 is not coupled to the second winding L22. This can simplify circuit control logic. In this application, effect of connecting the two groups of windings in the integrated inductor in the PFC circuit is same as effect of disposing two groups of discrete inductors in the PFC circuit. A board area occupied by the PFC circuit can be reduced, and the common-mode noise of the PFC circuit can be suppressed.

According to a value relationship between the quantity P of the second magnetic yokes and the quantity N of the magnetic cylinders in a same layer of space, the integrated inductor may include the following types of structures.

(a) N is greater than P by 1, and N is an integer greater than or equal to 2. In this case, the N magnetic cylinders in each layer of space and the P second magnetic yokes are alternately arranged, so that any two adjacent magnetic cylinders in the N magnetic cylinders may be spaced apart by one of the P second magnetic yokes.

(b) N is equal to P, and Nis an integer greater than or equal to 1. In this case, the N magnetic cylinders in each layer of space and the P second magnetic yokes are alternately arranged.

(c) N is less than P by 1, and Nis an integer greater than or equal to 1. In this case, the N magnetic cylinders in each layer of space and the P second magnetic yokes are alternately arranged, so that any two adjacent second magnetic yokes of the P second magnetic yokes may be spaced apart by one of the N magnetic cylinders.

Figure 8:
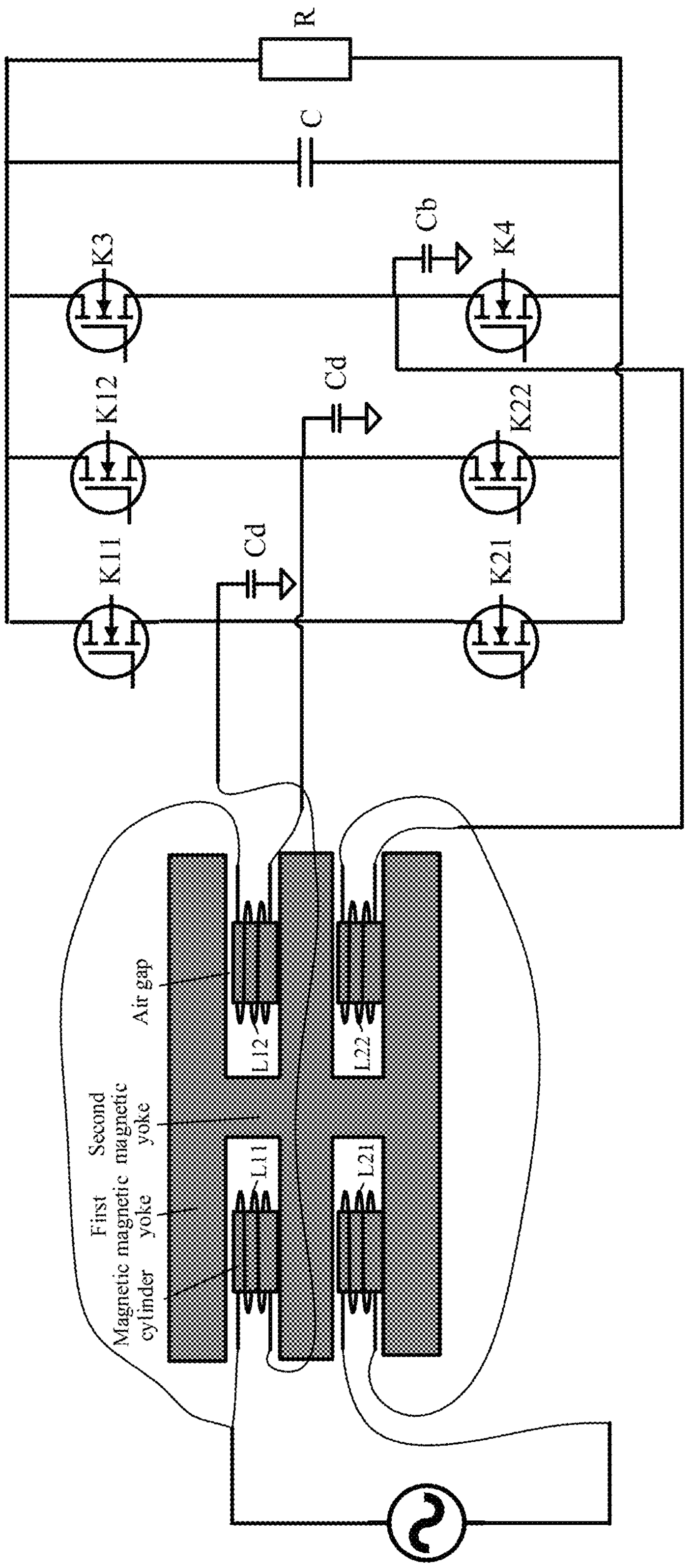
FIG. 8 is a diagram of still another structure of a PFC circuit according to this application.

FIG. 8 is a diagram of still another structure of a PFC circuit. As shown in FIG. 8, an example in which S is 2, M is 2, N is 2, and P is 1 is used, and a specific case in which an integrated inductor including two groups of windings is connected to the PFC circuit is shown. In this case, a quantity P of second magnetic yokes and a quantity N of magnetic cylinders in a same layer of space meet the foregoing case (a), two adjacent first magnetic yokes may form a layer of space, and two magnetic cylinders in a same layer of space are spaced apart by a same second magnetic yoke. Inductances of a winding L11 and a winding L12 may be the same, and magnetic fluxes respectively generated by the winding L11 and the winding L12 cancel on a second magnetic yoke between the winding L11 and the winding L12. Therefore, the winding L11 is not coupled to the winding L12. Similarly, the winding L21 is not coupled to the winding L22. The inductances of the winding L11 and the winding L21 are determined based on a Wheatstone equilibrium condition (that is, the foregoing relationship (1) and relationship (2)), and the magnetic fluxes respectively generated by the winding L11 and the winding L21 cancel on a first magnetic yoke between the winding L11 and the winding L21. Therefore, the winding L11 is not coupled to the winding L21. Similarly, the winding L12 is not coupled to the winding L22. As shown in FIG. 8, there may be an air gap between a magnetic cylinder and two adjacent first magnetic yokes, and there may be one or more air gaps. In FIG. 8, an example in which there is one air gap between a magnetic cylinder and a first magnetic yoke that is adjacent to and located above the magnetic cylinder is used. Actually, there may also be an air gap between the magnetic cylinder and a first magnetic yoke that is adjacent to and located below the magnetic cylinder. There may also be one or more air gaps between magnetic cylinders. This may be specifically set based on an actual requirement. Heights of magnetic cylinders in different layers of spaces may be the same or may be different. Each winding may be wound on a framework and then sleeved on the magnetic cylinder, or may be directly wound on the magnetic cylinder. This is not limited in this application.

When second magnetic yokes are respectively added to the left of the winding L11 and the left of the winding L21, or second magnetic yokes are respectively added to the right of the winding L12 and the right of the winding L22, N is 2, and P is also 2. In this case, the foregoing case (b) is met. When second magnetic yokes are respectively added to the left of the winding L11 and the left of the winding L21, and second magnetic yokes are respectively added to the right of the winding L12 and the right of the winding L22, N is 2, and P is 3. In this case, the foregoing case (c) is met.

It should be noted that an example in which an arrangement direction of the S first magnetic yokes is a vertical direction is used in FIG. 8. Actually, the arrangement direction may alternatively be a horizontal direction or the like. This is not limited in this application.

In this application, two groups of inductors are disposed in the PFC circuit, so that a Wheatstone bridge equivalent to the PFC circuit is balanced, and common-mode noise of the PFC circuit can be suppressed. The two groups of inductors may be two groups of windings in an integrated inductor, and the two groups of windings are respectively located in spaces formed by two groups of first magnetic yokes in the integrated inductor, so that a board area occupied by the integrated inductor is smaller than a board area occupied by two groups of normal discrete inductors. In this way, an occupied board area and costs can be reduced while common-mode noise of the PFC circuit is suppressed, and product power density can be improved.

Figure 9:
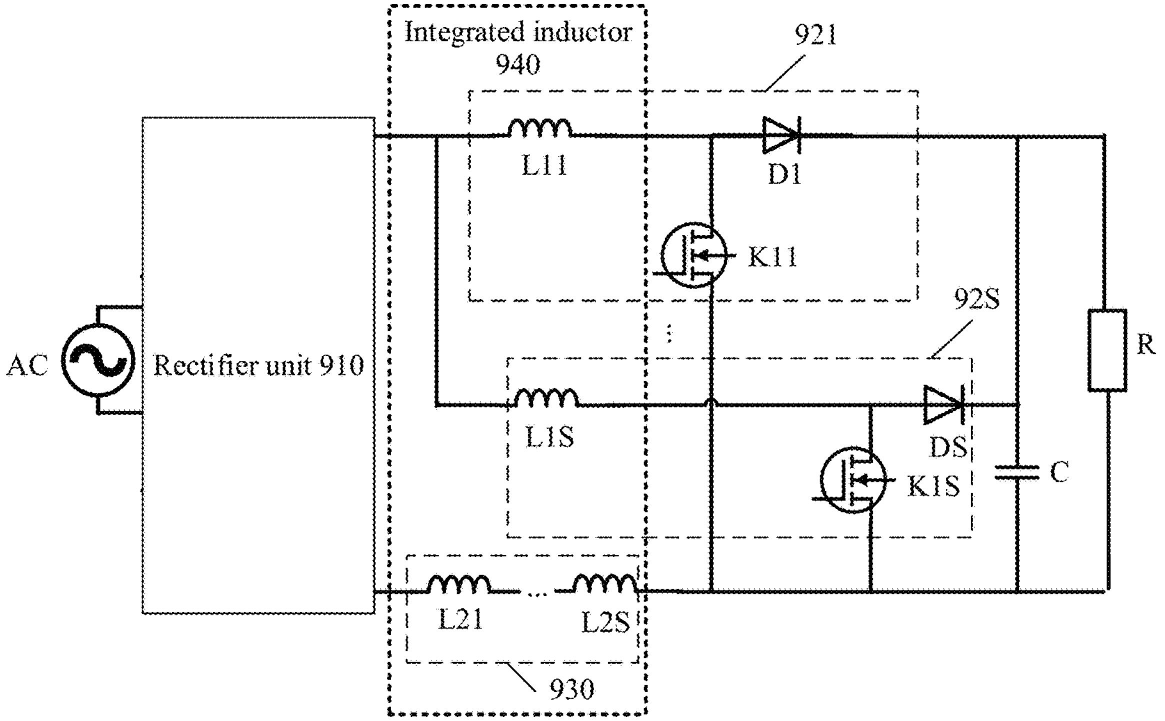
FIG. 9 is a diagram of still another structure of a PFC circuit according to this application.

FIG. 9 is a diagram of still another structure of a PFC circuit according to this application. As shown in FIG. 9, the PFC circuit includes a rectifier unit (for example, 910 in FIG. 9), S PFC branches (for example, 921 to 92S in FIG. 9), a filter capacitor (for example, a capacitor C in FIG. 9), and an integrated inductor (for example, 940 in FIG. 9). The integrated inductor may include a magnetic core, S first windings (for example, L11 to LIS in FIG. 9), and S second windings (for example, L21 to L2S in FIG. 9). Herein, S may be an integer greater than or equal to 1. Each of the S PFC branches includes one first winding in the S first windings, a diode, and a first switch. As shown in FIG. 9, a PFC branch 921 includes a first winding L11, a diode D1, and a first switch K11, . . . , and a PFC branch 92S includes a first winding L1S, a diode DS, and a first switch K1S. The diode and the first switch in each PFC branch are connected in series and then connected in parallel to the filter capacitor. A first end of the first winding in each PFC branch is connected to a first output end of the rectifier unit, and a second end of the first winding in each PFC branch is connected to a point at which the diode and the first switch in the PFC branch are connected in series. The S second windings form a balancing unit (for example, 930 in FIG. 9). A first end of the balancing unit is connected to a second output end of the rectifier unit, and a second end of the balancing unit is connected to a point at which the filter capacitor and the first switch are connected. An input end of the rectifier unit may be configured to connect to an alternating current power supply (for example, an AC in FIG. 9), two ends of the filter capacitor may be used as an output end of the PFC circuit, and the output end of the PFC circuit may be configured to connect to a load (for example, a resistor R in FIG. 9). In the PFC circuit, based on the balancing unit including the S second windings, common-mode noise of the PFC circuit can be suppressed, and EMI can be optimized.

In the PFC circuit, the magnetic core of the integrated inductor includes M+1 first magnetic yokes sequentially arranged in parallel. Herein, M may be an integer greater than or equal to 2. The S first windings and the S second windings are disposed in spaces formed by any two adjacent first magnetic yokes of the M+1 first magnetic yokes. Two adjacent first magnetic yokes corresponding to a space in which the S first windings are located are the same, and two adjacent first magnetic yokes corresponding to a space in which the S second windings are located are the same. In addition, one of the two adjacent first magnetic yokes corresponding to the space in which the S first windings are located is different from the two adjacent first magnetic yokes corresponding to the space in which the S second windings are located. In this case, the first windings and the second windings are respectively located in different spaces.

When the PFC circuit is mounted on a printed circuit board PCB, a $1^{st}$ first magnetic yoke of the M+1 first magnetic yokes in the integrated inductor is configured to connect to the PCB, and the M+1 first magnetic yokes are arranged in parallel along a first direction. The first direction is perpendicular to a first surface of the PCB, and the first surface is a surface used by the PCB for mounting the PFC circuit. In this case, when the S first windings and the S second windings in the integrated inductor are all connected to the PFC circuit shown in FIG. 9, an area occupied by the integrated inductor on the PCB is approximately equal to an area of the $1^{st}$ first magnetic yoke. In comparison with S discrete first inductors and S discrete second inductors directly disposed in the PFC circuit, the S first windings and the S second windings in this application can reduce a board area occupied by the PFC circuit, reduce material costs, and improve product power density.

In some feasible implementations, when S is greater than or equal to 2, the balancing unit includes the S second windings that are sequentially connected in series. In this case, in the PFC circuit shown in FIG. 9, the balancing unit 930 may include a second winding L21, . . . , and a second winding L2S that are sequentially connected in series. The balancing unit formed by the S second windings may be considered as a total inductor, and a proper impedance may be provided for the PFC circuit, so that common-mode noise of the PFC circuit is reduced, and EMI is optimized.

Figure 10:
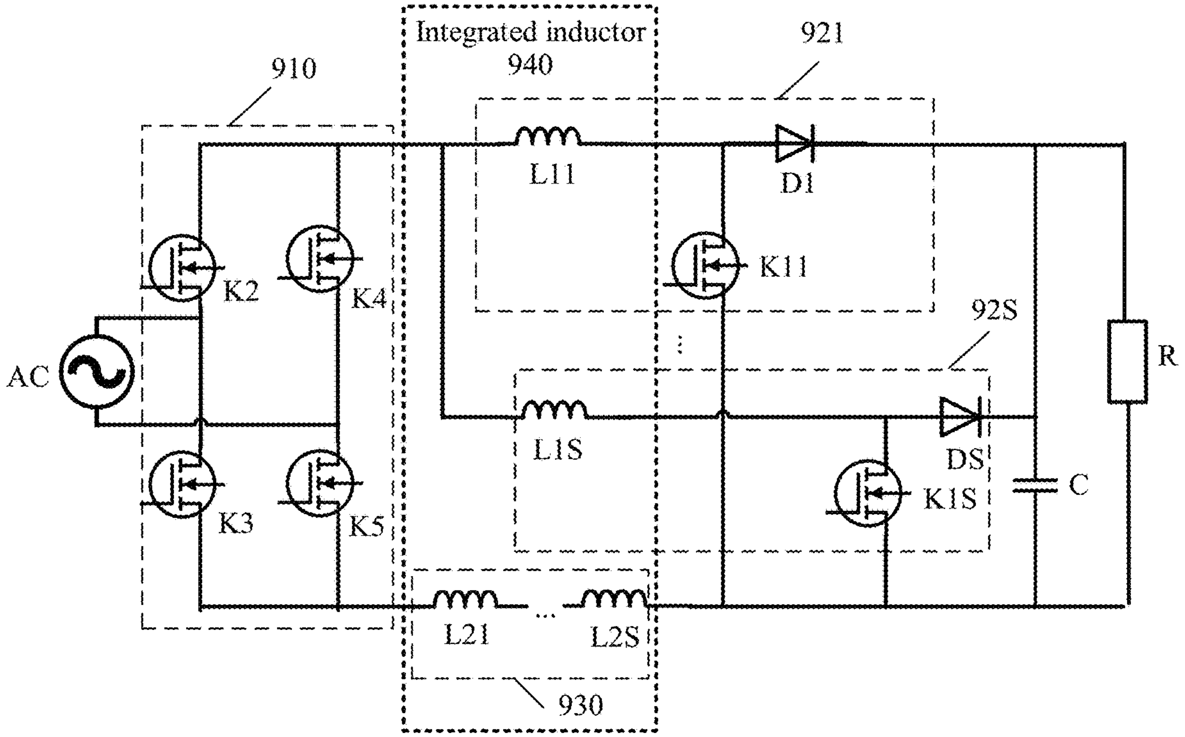
FIG. 10 is a diagram of still another structure of a PFC circuit according to this application.

FIG. 10 is a diagram of another structure of a PFC circuit according to this application. In comparison with the PFC circuit shown in FIG. 9, a rectifier unit 910 in the PFC circuit shown in FIG. 10 may include a second switch and a third switch (for example, switches K2 and K3 in FIG. 10) connected in series, and a fourth switch and a fifth switch (for example, switches K4 and K5 in FIG. 10) connected in series. A point at which the second switch and the third switch are connected in series is connected to a first end of an alternating current power supply, and a point at which the fourth switch and the fifth switch are connected in series is connected to a second end of the alternating current power supply. Both a first end of the second switch and a first end of the fourth switch are connected to a first output end of the rectifier unit, and both a first end of the third switch and a second end of the fifth switch are connected to a second output end of the rectifier unit. Herein, each switch in the rectifier unit may be a MOS transistor, an IGBT, gallium nitride (GaN), silicon carbide (SiC), or the like. This is not limited in this application. In FIG. 10, an example in which each switch is an NMOS transistor is used. In this case, a first end of each switch may be a drain of the NMOS transistor, and a second end of each switch may be a source of the NMOS transistor. Each switch in the rectifier unit is turned on or turned off based on a control signal, so that an alternating current provided by the alternating current power supply can be converted into a direct current. The rectifier unit, S PFC branches, and a filter capacitor work together to improve a current waveform and increase a power factor.

In some feasible implementations, inductances of S first windings are the same, and inductances of S second windings are the same. As shown in FIG. 3, inductances of a first winding L11, . . . , and a first winding L1S are the same, and inductances of a second winding L21, . . . , and a second winding L2S are the same. In the PFC circuit, one of the S PFC branches corresponds to one phase in the PFC circuit. The S first windings with a same inductance and the S second windings with a same inductance are disposed, so that common-mode noise of the PFC circuit can be suppressed and EMI can be optimized.

The following specifically describes a principle of suppressing the common-mode noise by adding a balancing unit in the PFC circuit.

In the PFC circuit, a first capacitor exists between a second end of a first winding in each of the S first PFC branches and a reference ground. The first capacitor may actually include a Y capacitor, a parasitic capacitor, and the like. That is, the first capacitor may be an equivalent capacitor. A second capacitor exists between a second end of the balancing unit and the reference ground. The second capacitor may actually include a Y capacitor, a parasitic capacitor, and the like. That is, the second capacitor may also be an equivalent capacitor. Herein, the first capacitor may be represented by Cd, and the second capacitor may be represented by Cb.

It can be learned from circuit analysis that the S first windings, the S second windings, S first capacitors, and the second capacitor in the PFC circuit may form a Wheatstone bridge. When the Wheatstone bridge is balanced, the common-mode noise of the PFC circuit is not transmitted outside the PFC circuit, so that the common-mode noise of the PFC circuit can be effectively reduced, and EMC can be optimized. S may be an integer greater than or equal to 1. For different values of S, equations for Wheatstone bridge equilibria are different. Therefore, cases in which values of S are 2, 3, and 1 are described as examples respectively.

Figure 11:
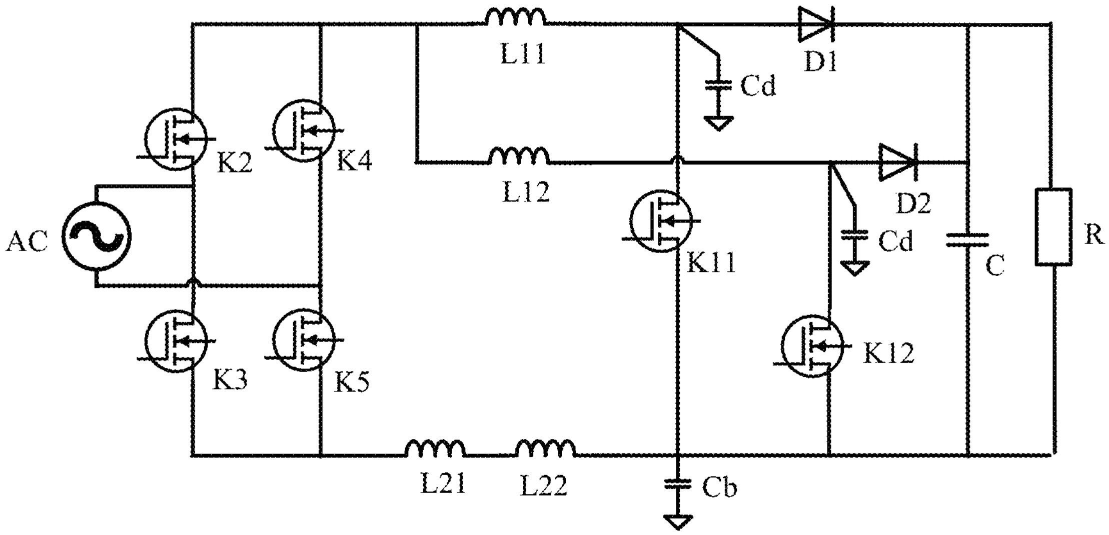
FIG. 11 is a diagram of still another structure of a PFC circuit according to this application.

When S is 2, the PFC circuit includes two PFC branches, and an integrated inductor includes two first windings and two second windings. In this case, the PFC circuit is a two-phase bridge PFC circuit. A structure of the PFC circuit is shown in FIG. 11. When impedances Z1, Z2, Z3, and Z4 that are of four bridge arms of the Wheatstone bridge and that are equivalently obtained by the PFC circuit meet the foregoing relationship (1), the Wheatstone bridge is balanced, and the PFC circuit has the minimum common-mode noise. In the PFC circuit, the impedances of the four bridge arms of the Wheatstone bridge and the first winding, the second winding, the first capacitor, and the second capacitor in the PFC circuit meet the foregoing relationship (2).

When S is 3, the PFC circuit includes three PFC branches, and the integrated inductor includes three first windings and three second windings. In this case, the PFC circuit is a three-phase bridge PFC circuit. In a Wheatstone bridge equivalently obtained by the PFC circuit, when impedances Z1, Z2, Z3, and Z4 of four bridge arms of the Wheatstone bridge meet the foregoing relationship (1), the Wheatstone bridge is balanced, and the PFC circuit has the minimum common-mode noise. In the PFC circuit, the impedances of the four bridge arms of the Wheatstone bridge and the first winding, the second winding, the first capacitor, and the second capacitor in the PFC circuit meet the foregoing relationship (3).

When S is 1, the PFC circuit includes one PFC branch, and the integrated inductor includes one first winding and one second winding. In this case, the PFC circuit is a single-phase bridge PFC circuit. In a Wheatstone bridge equivalently obtained by the PFC circuit, when impedances Z1, Z2, Z3, and Z4 of four bridge arms of the Wheatstone bridge meet the foregoing proportional relationship (1), the Wheatstone bridge is balanced, and the PFC circuit has the minimum common-mode noise. In the PFC circuit, the impedances of the four bridge arms of the Wheatstone bridge and the first winding, the second winding, the first capacitor, and the second capacitor in the PFC circuit meet the foregoing relationship (4).

In this application, a balancing unit formed by the second winding is added to the PFC circuit including the first winding, that is, two groups of inductors with proper inductance values are disposed in the PFC circuit, so that the Wheatstone bridge equivalent to the PFC circuit is balanced, the common-mode noise of the PFC circuit can be suppressed, and the EMI can be optimized.

In some feasible implementations, M is greater than or equal to 3, and the integrated inductor further includes S third windings. Two adjacent first magnetic yokes corresponding to a space in which the S third windings are located are the same, one of the two adjacent first magnetic yokes corresponding to the space in which the S third windings are located is different from two adjacent first magnetic yokes corresponding to a space in which the S first windings are located. In addition, one of the two adjacent first magnetic yokes corresponding to the space in which the S third windings are located is different from two adjacent first magnetic yokes corresponding to a space in which the S second windings are located. In this case, the S first windings, the S second windings, and the S third windings are respectively located in different spaces. Further, a quantity of turns of the third winding meets any one of the following: The quantity of turns of the third winding is different from a quantity of turns of the first winding; the quantity of turns of the third winding is different from a quantity of turns of the second winding; and the quantity of turns of the third winding is different from the quantity of turns of the first winding and the quantity of turns of the second winding. In this way, the third winding may be used as a backup winding. When the inductance of the first winding is inappropriate, the third winding with a more appropriate inductance may be used to replace the first winding, and the third winding is connected to the PFC circuit, to reduce the common-mode noise of the PFC circuit. Alternatively, when the inductance of the second winding is inappropriate, the third winding with a more appropriate inductance may be used to replace the second winding, and the third winding is connected to the PFC circuit, to reduce the common-mode noise of the PFC circuit.

It should be noted that the third winding is merely an example, and the backup winding in the integrated inductor may further include a fourth winding, a fifth winding, and . . . , which may be specifically determined based on factors such as an actual scenario requirement and costs. A quantity of backup windings is not limited in this application.

In this application, at least three groups of windings in different spaces are disposed in the integrated inductor, to provide a backup winding for the PFC circuit. In this case, when an element parameter in the PFC circuit changes, two groups of windings with proper inductance values can be provided to connect to the PFC circuit. In this way, the Wheatstone bridge equivalent to the PFC circuit can be balanced, the common-mode noise in the PFC circuit can be suppressed, and the EMI can be optimized. In addition, when a plurality of groups of windings are disposed in the integrated inductor, a board area an area occupied by the PFC circuit is not increased. In comparison with a plurality of groups of discrete inductors, the plurality of groups of windings can greatly reduce the occupied board area, and improve product power density.

In some feasible implementations, a magnetic core further includes M*N magnetic cylinders and P second magnetic yokes arranged in parallel, where N is an integer greater than or equal to S, P is an integer greater than or equal to 1, and a difference between N and P is less than or equal to 1. Herein, N may be greater than P by 1, N is equal to P, or Nis less than P by 1. The P second magnetic yokes are all perpendicular to M+1 first magnetic yokes, and are disposed between a $1^{st}$ first magnetic yoke and a last first magnetic yoke of the M+1 first magnetic yokes. Each of the P second magnetic yokes is in communication with the $1^{st}$ first magnetic yoke and the last first magnetic yoke. Herein, when the second magnetic yoke is in communication with the first magnetic yoke, there may be no air gap at a place where the second magnetic yoke and the first magnetic yoke are in contact.

N magnetic cylinders are disposed in a layer of space formed by any two adjacent first magnetic yokes of the M+1 first magnetic yokes in the integrated inductor, and each of the N magnetic cylinders in each layer of space is in contact with two adjacent first magnetic yokes corresponding to the layer of space. Herein, the magnetic cylinder is in contact with two adjacent first magnetic yokes, and may provide a transmission path for magnetic induction lines generated by a winding disposed on the magnetic cylinder, so that the magnetic induction lines can be transmitted in a closed loop. The N magnetic cylinders in each layer of space are all parallel to the P second magnetic yokes, and the N magnetic cylinders in each layer of space and the P second magnetic yokes are alternately arranged. One winding is disposed on each of the M*N magnetic cylinders. Herein, magnetic induction lines generated by a winding disposed on any magnetic cylinder in each layer of space pass through a second magnetic yoke adjacent to the magnetic cylinder, and do not pass through another magnetic cylinder in the layer of space. Magnetic fluxes generated by windings disposed on two adjacent magnetic cylinders in a same layer of space cancel on a second magnetic yoke between the two magnetic cylinders. Therefore, currents in windings on magnetic cylinders in a same layer of space do not affect each other, and windings on different magnetic cylinders in the same layer of space are not coupled. This can simplify circuit control logic. In addition, magnetic fluxes generated by two windings respectively located in an upper layer of space and a lower layer of space of a same first magnetic yoke cancel on the first magnetic yoke. Therefore, the two windings respectively located in the upper layer of space and the lower layer of space of the same first magnetic yoke are not coupled. This can simplify the circuit control logic. In this application, effect of connecting the two groups of windings in the integrated inductor in the PFC circuit is same as effect of disposing two groups of discrete inductors in the PFC circuit. A board area occupied by the PFC circuit can be reduced, and common-mode noise of the PFC circuit can be suppressed.

According to a value relationship between the quantity P of the second magnetic yokes and the quantity N of magnetic cylinders in a same layer of space, structures of the integrated inductor may include three cases (a), (b), and (c) mentioned above.

Figure 12:
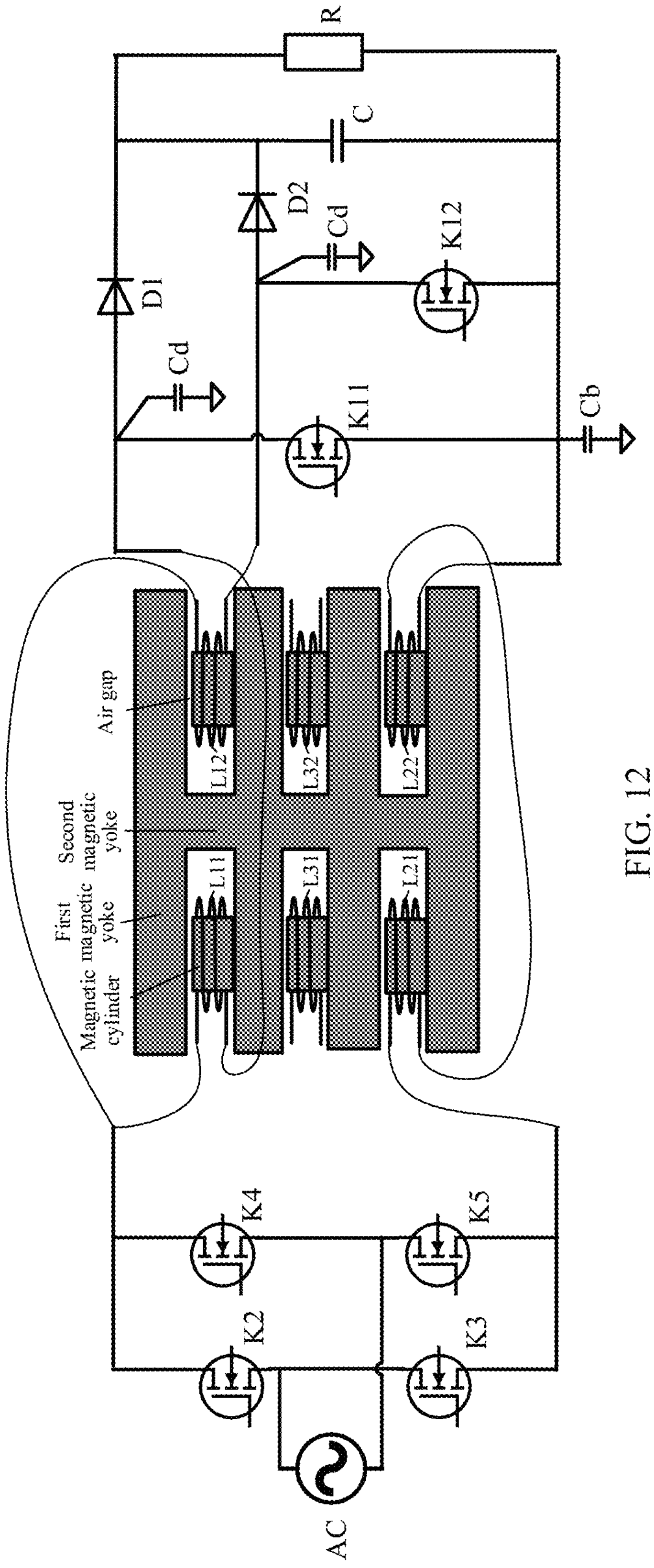
FIG. 12 is a diagram of still another structure of a PFC circuit according to this application.

FIG. 12 is a diagram of still another structure of a PFC circuit. As shown in FIG. 12, an example in which S is 3, M is 2, N is 2, and P is 1 is used, and a specific case in which an integrated inductor including two groups of windings is connected to the PFC circuit is shown. In this case, a quantity P of second magnetic yokes and a quantity N of magnetic cylinders in a same layer of space meet the foregoing case (a), two adjacent first magnetic yokes may form a layer of space, and two magnetic cylinders in a same layer of space are spaced apart by a same second magnetic yoke. Inductances of a winding L11 and a winding L12 may be the same, and magnetic fluxes respectively generated by the winding L11 and the winding L12 cancel on a second magnetic yoke between the winding L11 and the winding L12. Therefore, the winding L11 is not coupled to the winding L12. Similarly, a winding L21 is not coupled to a winding L22. Inductances of the winding L11 and the winding L21 are determined based on a Wheatstone equilibrium condition (that is, the foregoing relationship (1) and relationship (2)), and two adjacent first magnetic yokes corresponding to a space in which the winding L11 is located are different from two adjacent first magnetic yokes corresponding to a space in which the winding L21 is located, transmission paths of magnetic fluxes respectively generated by the two windings do not overlap. Therefore, the winding L11 is not coupled to the winding L21. Similarly, the winding L12 is not coupled to the winding L22. A winding L31 and a winding L32 (which may be referred to as third windings) may be used as backup windings. If inductances of first windings (the winding L11 and the winding L12) or second windings (the winding L21 and the winding L22) are inappropriate, the third windings may be used to replace the first windings or the second windings, to suppress common-mode noise of the PFC circuit. As shown in FIG. 12, there may be an air gap between a magnetic cylinder and two adjacent first magnetic yokes, and there may be one or more air gaps. In FIG. 12, an example in which there is one air gap between a magnetic cylinder and a first magnetic yoke that is adjacent to and located above the magnetic cylinder is used. Actually, there may also be an air gap between the magnetic cylinder and a first magnetic yoke that is adjacent to and located below the magnetic cylinder. There may also be one or more air gaps between magnetic cylinders. This may be specifically set based on an actual requirement. Heights of magnetic cylinders in different layers of spaces may be the same or may be different. Each winding may be wound on a framework and then sleeved on the magnetic cylinder, or may be directly wound on the magnetic cylinder.

When second magnetic yokes are respectively added to the left of the winding L11 and the left of the winding L21, or second magnetic yokes are respectively added to the right of the winding L12 and the right of the winding L22, N is 2, and P is also 2. In this case, the foregoing case (b) is met. When second magnetic yokes are respectively added to the left of the winding L11 and the left of the winding L21, and second magnetic yokes are respectively added to the right of the winding L12 and the right of the winding L22, N is 2, and P is 3. In this case, the foregoing case (c) is met.

It should be noted that an example in which an arrangement direction of S first magnetic yokes is a vertical direction is used in FIG. 12. Actually, the arrangement direction may alternatively be a horizontal direction or the like. This is not limited in this application.

In this application, two groups of inductors are disposed in the PFC circuit, so that a Wheatstone bridge equivalent to the PFC circuit is balanced, and common-mode noise of the PFC circuit can be suppressed. The two groups of inductors may be two groups of windings in an integrated inductor, and the two groups of windings are respectively located in spaces formed by two groups of first magnetic yokes in the integrated inductor, so that a board area occupied by the integrated inductor is smaller than a board area occupied by two groups of normal discrete inductors. In this way, an occupied board area and costs can be reduced while common-mode noise of the PFC circuit is suppressed, and product power density can be improved.

This application further provides an integrated inductor. The integrated inductor may include a magnetic core and M*N windings. The magnetic core includes M+1 first magnetic yokes, P second magnetic yokes, and M*N magnetic cylinders. M is an integer greater than or equal to 2, both N and P are integers greater than or equal to 1, and a difference between N and P is less than or equal to 1. The M+1 first magnetic yokes in the integrated inductor are sequentially arranged in parallel. The P second magnetic yokes are all perpendicular to the M+1 first magnetic yokes, and are arranged in parallel between a 1st first magnetic yoke and a last first magnetic yoke in the M+1 first magnetic yokes. In addition, each of the P second magnetic yokes is in communication with the 1st first magnetic yoke and the last first magnetic yoke. Herein, when the second magnetic yoke is in communication with the first magnetic yoke, magnetic induction lines generated by a winding may be transmitted from the second magnetic yoke to the first magnetic yoke in communication with the second magnetic yoke, or the magnetic induction lines are transmitted from the first magnetic yoke to the second magnetic yoke in communication with the first magnetic yoke, to create a condition for forming a closed loop for a transmission path of the magnetic induction lines of the winding.

N magnetic cylinders are disposed in a layer of space formed by any two adjacent first magnetic yokes of the M+1 first magnetic yokes in the integrated inductor, and each of the N magnetic cylinders in each layer of space is in contact with two adjacent first magnetic yokes corresponding to the layer of space. Herein, that the magnetic cylinder is in contact with the first magnetic yoke means that magnetic induction lines generated by a winding can be transmitted from a magnetic cylinder corresponding to the winding to a first magnetic yoke in contact with the magnetic cylinder. Actually, the magnetic cylinder may be bonded to the first magnetic yoke to implement contact with the first magnetic yoke; or the magnetic cylinder may be in contact with the first magnetic yoke in another manner, for example, the magnetic cylinder and the first magnetic yoke are integrally formed. This is not limited in this application. The N magnetic cylinders in each layer of space are all parallel to the P second magnetic yokes, and the N magnetic cylinders in each layer of space and the P second magnetic yokes are alternately arranged. The M*N windings included in the integrated inductor are respectively disposed on the M*N magnetic cylinders. Herein, magnetic induction lines generated by a winding disposed on any magnetic cylinder in each layer of space pass through a second magnetic yoke adjacent to the magnetic cylinder, and do not pass through another magnetic cylinder in the layer of space. Magnetic fluxes generated by windings disposed on two adjacent magnetic cylinders in a same layer of space cancel on a second magnetic yoke between the two magnetic cylinders. Therefore, currents in windings on magnetic cylinders in a same layer of space do not affect each other, and windings on different magnetic cylinders in the same layer of space are not coupled. In addition, magnetic fluxes generated by two windings respectively located in an upper layer of space and a lower layer of space of a same first magnetic yoke cancel on the first magnetic yoke. Therefore, the two windings respectively located in the upper layer of space and the lower layer of space of the same first magnetic yoke are not coupled. This can simplify the circuit control logic.

In some feasible implementations, the 1st first magnetic yoke of the M+1 first magnetic yokes is configured to connect to a printed circuit board PCB. When the integrated inductor is mounted on the PCB, the M+1 first magnetic yokes in the integrated inductor are arranged in parallel along a first direction, the first direction is perpendicular to a first surface of the PCB, and the first surface is a surface used by the PCB for mounting the integrated inductor. In this way, when the integrated inductor is mounted on the PCB board and is connected to the PFC circuit shown in FIG. 2 or FIG. 9, an area occupied by the integrated inductor on the PCB is approximately equal to an area of the 1st first magnetic yoke. In comparison with S discrete first inductors and S discrete second inductors, the integrated inductor can reduce an occupied board area, reduce material costs, and improve product power density.

In this embodiment of this application, that the difference between N and P is less than or equal to 1 means that an absolute value of the difference between N and P is 0 or 1, which may specifically include the following cases: N is greater than P by 1, N is equal to P, and Nis less than P by 1. The following describes a structure of the integrated inductor in detail based on values of N and P.

(a) N is greater than P by 1, and N is an integer greater than or equal to 2. In the integrated inductor, the N magnetic cylinders in each layer of space and the P second magnetic yokes are alternately arranged, so that any two adjacent magnetic cylinders in the N magnetic cylinders in each layer of space are spaced apart by one of the P second magnetic yokes. A quantity of magnetic cylinders in each layer of space is greater than a quantity of second magnetic yokes by 1.

Figure 13:
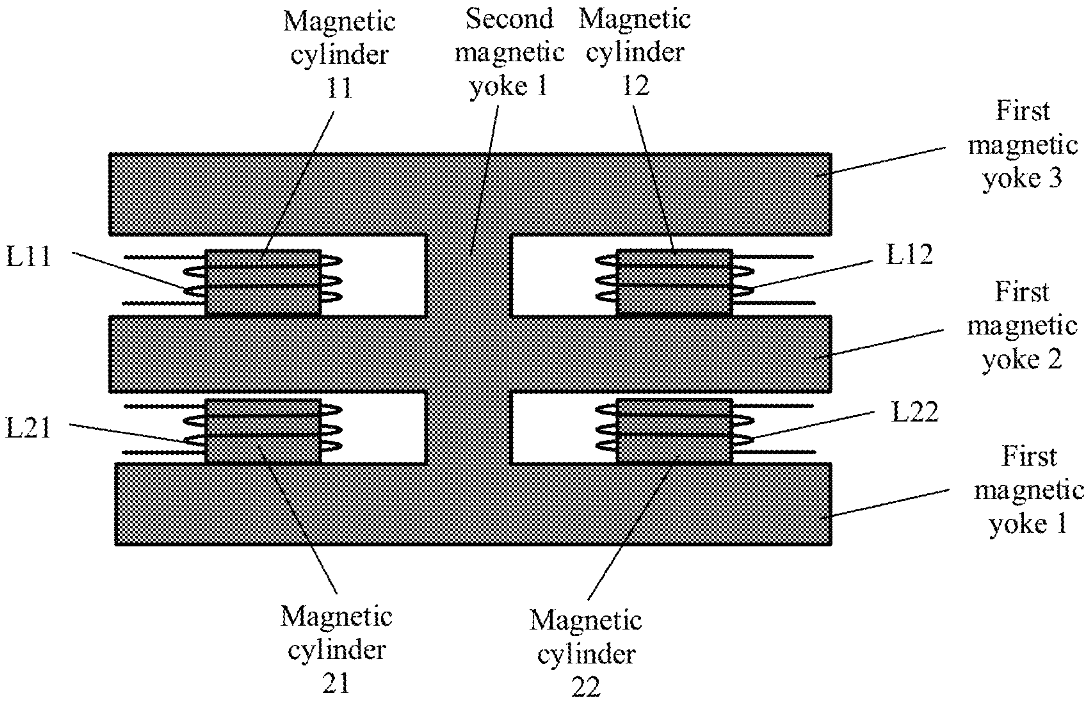
FIG. 13 is a diagram of a structure of an integrated inductor according to this application.

For example, the M+1 first magnetic yokes are sequentially arranged along a vertical direction. When N is 2 and P is 1, a structure of the integrated inductor may be shown in FIG. 13. In this case, the M+1 first magnetic yokes may form M layers of spaces in total (in FIG. 13, an example in which M is 2 is used), two magnetic cylinders are disposed in each layer of space, and the entire integrated inductor includes 2*2=4 windings in total. One second magnetic yoke is disposed between the 1st first magnetic yoke and the last first magnetic yoke in the M+1 first magnetic yokes, and the two magnetic cylinders in each layer of space are separated by the second magnetic yoke. In this case, the integrated inductor may be used in the PFC circuit shown in FIG. 4 or FIG. 11. In the integrated inductor, a transmission path of magnetic induction lines generated by a winding on any magnetic cylinder is set to: the magnetic cylinder→a first magnetic yoke adjacent to the magnetic cylinder→a second magnetic yoke adjacent to the magnetic cylinder→another first magnetic yoke adjacent to the magnetic cylinder→the magnetic cylinder. A closed loop is formed. For example, a magnetic flux generated by a winding L11 propagates along a path: a magnetic cylinder 11→a first magnetic yoke 3→a second magnetic yoke 1→a first magnetic yoke 2→the magnetic cylinder 11. Magnetic fluxes generated by two windings on magnetic cylinders in two adjacent layers of spaces cancel on a first magnetic yoke between the two windings, so that the two windings can be prevented from being coupled. For example, the magnetic flux generated by the winding L11 and a magnetic flux generated by a winding L21 cancel on the first magnetic yoke 2. Therefore, the winding L11 is not coupled to the winding L21, and the winding L11 and the winding L21 are equivalent to two discrete inductors. Similarly, a winding L12 and a winding L22 are also equivalent to two discrete inductors. In addition, two adjacent windings located in a same layer of space are spaced apart by a same second magnetic yoke, and magnetic fluxes respectively generated by the two windings cancel on the second magnetic yoke between the two windings. Therefore, the two windings are not coupled. For example, the magnetic flux generated by the winding L11 and a magnetic flux generated by the winding L12 cancel on the second magnetic yoke 1. Therefore, the winding L11 is not coupled to the winding L12, and the winding L11 and the winding L12 are equivalent to two discrete inductors. Similarly, the winding L21 and the winding L22 are also equivalent to two discrete inductors. The winding L11, the winding L21, the winding L12, and the winding L22 are integrated together, and the four windings in the integrated inductor may have same effect as four discrete inductors. However, an occupied PCB area is approximately equal to areas of two inductors. This reduces the occupied board area and material costs. The integrated inductor is used in the PFC circuit to suppress common-mode noise of the PFC circuit and optimize EMI.

Figure 14:
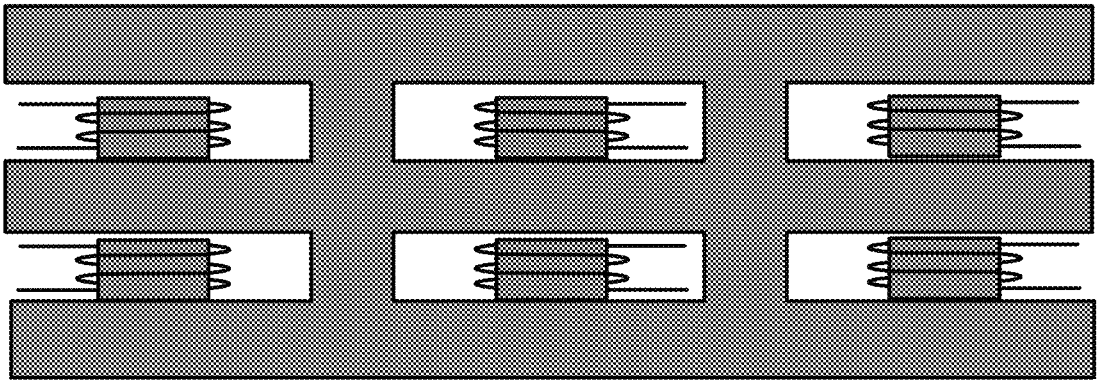
FIG. 14 is a diagram of another structure of an integrated inductor according to this application.

For example, the M+1 first magnetic yokes are sequentially arranged along the vertical direction. When N is 3 and P is 2, a structure of the integrated inductor may be shown in FIG. 14. In this case, the M+1 first magnetic yokes may form M layers of spaces in total, three magnetic cylinders are disposed in each layer of space, and two second magnetic yokes are disposed between the 1$^{st}$ first magnetic yoke and the last first magnetic yoke in the M+1 first magnetic yokes. Any two adjacent magnetic cylinders in the three magnetic cylinders in each layer of space are separated by one second magnetic yoke in the two second magnetic yokes. In this case, the integrated inductor may be used in the three-phase interleaved bridgeless PFC circuit or the three-phase bridge PFC circuit shown in FIG. 6.

(b) N is equal to P, and N is an integer greater than or equal to 1. In the integrated inductor, the N magnetic cylinders in each layer of space and the P second magnetic yokes are alternately arranged, and the quantity of magnetic cylinders in each layer of space is equal to the quantity of second magnetic yokes.

Figure 15:
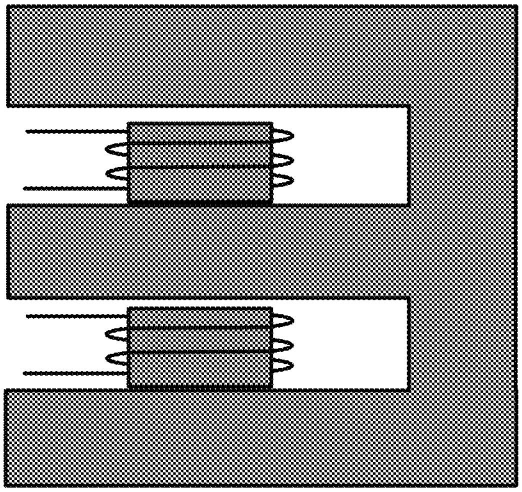
FIG. 15 is a diagram of still another structure of an integrated inductor according to this application.

For example, the M+1 first magnetic yokes are sequentially arranged along the vertical direction. When N is 1 and P is 1, a structure of the integrated inductor may be shown in FIG. 15. In this case, the M+1 first magnetic yokes may form M layers of spaces in total, one magnetic cylinder is disposed in each layer of space, and one second magnetic yoke is disposed between the 1$^{st}$ first magnetic yoke and the last first magnetic yoke in the M+1 first magnetic yokes. In this case, the integrated inductor may be used in a non-interleaved bridgeless PFC circuit or the single-phase bridge PFC circuit shown in FIG. 7. As shown in FIG. 15, the second magnetic yoke, a magnetic cylinder in each layer of space, and two first magnetic yokes adjacent to the magnetic cylinder form a closed loop together, to provide a transmission path for magnetic induction lines generated by a winding on the magnetic cylinder.

Figure 16:
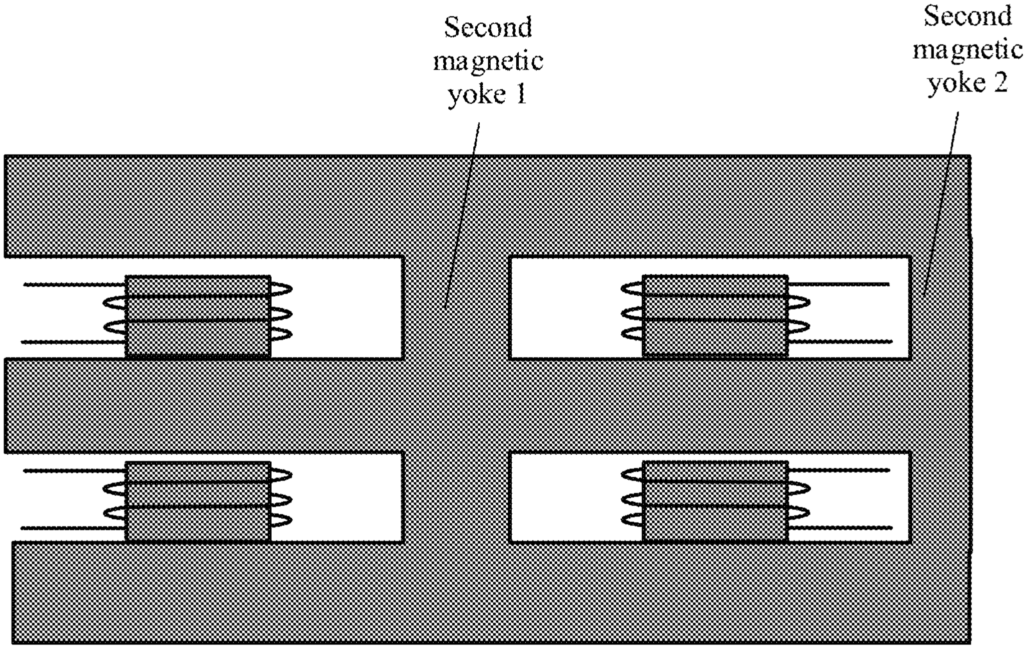
FIG. 16 is a diagram of still another structure of an integrated inductor according to this application.

For example, the M+1 first magnetic yokes are sequentially arranged along the vertical direction. When N is 2 and P is 2, a structure of the integrated inductor may be shown in FIG. 16. In this case, the M+1 first magnetic yokes may form M layers of spaces in total, two magnetic cylinders are disposed in each layer of space, and two second magnetic yokes are disposed between the 1$^{st}$ first magnetic yoke and the last first magnetic yoke in the M+1 first magnetic yokes. The two magnetic cylinders in each layer of space and the two second magnetic yokes are alternately arranged. In this case, the integrated inductor may be used in the PFC circuit shown in FIG. 4 or FIG. 11. As shown in FIG. 16, magnetic fluxes generated by a left winding and a right winding located in a same layer of space cancel on the second magnetic yoke 1. The magnetic flux generated by the right winding is partially canceled after passing through the second magnetic yoke 1, and the other part returns to a magnetic cylinder corresponding to the winding after passing through the second magnetic yoke 2. In this case, the two windings are not coupled. This can simplify circuit control logic.

(c) N is less than P by 1, and N is an integer greater than or equal to 1. In the integrated inductor, the N magnetic cylinders in each layer of space and the P second magnetic yokes are alternately arranged, so that any two adjacent second magnetic yokes in the P second magnetic yokes are spaced apart by one of the N magnetic cylinders in each layer of space. The quantity of magnetic cylinders in each layer of space is less than the quantity of second magnetic yokes by 1.

Figure 17:
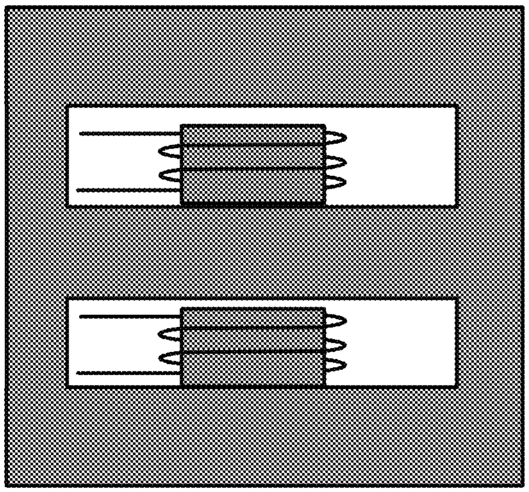
FIG. 17 is a diagram of still another structure of an integrated inductor according to this application.

For example, the M+1 first magnetic yokes are sequentially arranged along the vertical direction. When N is 1 and P is 2, a structure of the integrated inductor may be shown in FIG. 17. In this case, the M+1 first magnetic yokes may form M layers of spaces in total, one magnetic cylinder is disposed in each layer of space, and one second magnetic yoke is disposed between the 1$^{st}$ first magnetic yoke and the last first magnetic yoke in the M+1 first magnetic yokes. In this case, the integrated inductor may be used in the non-interleaved bridgeless PFC circuit or the single-phase bridge PFC circuit shown in FIG. 7. As shown in FIG. 17, the magnetic cylinder, two first magnetic yokes adjacent to the magnetic cylinder, and a second magnetic yoke on the left of the magnetic cylinder form a closed loop together, to provide a transmission path for some magnetic induction lines generated by a winding on the magnetic cylinder. The magnetic cylinder, the two first magnetic yokes adjacent to the magnetic cylinder, and a second magnetic yoke on the right of the magnetic cylinder form a closed loop, to provide a transmission path for the other magnetic induction lines generated by the winding on the magnetic cylinder.

Figure 18:
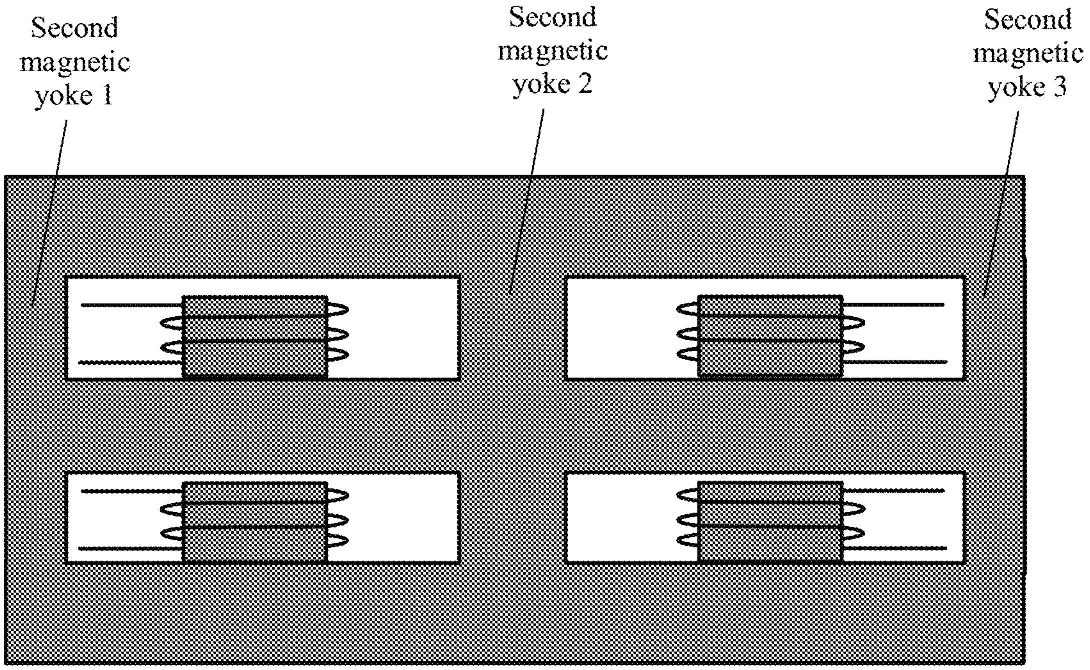
FIG. 18 is a diagram of still another structure of an integrated inductor according to this application.

For example, the M+1 first magnetic yokes are sequentially arranged along the vertical direction. When N is 2 and P is 3, a structure of the integrated inductor may be shown in FIG. 18. In this case, the M+1 first magnetic yokes may form M layers of spaces in total, two magnetic cylinders are disposed in each layer of space, and three second magnetic yokes are disposed between the 1$^{st}$ first magnetic yoke and the last first magnetic yoke in the M+1 first magnetic yokes. Any two adjacent second magnetic yokes in the three second magnetic yokes are separated by one of the three magnetic cylinders in each layer of space. In this case, the integrated inductor may be used in the PFC circuit shown in FIG. 4 or FIG. 11. Magnetic fluxes generated by a left winding and a right winding located in a same layer of space are respectively transmitted in two adjacent second magnetic yokes, and parts of the magnetic fluxes respectively generated by the two windings cancel on the second magnetic yoke 1. The other part of the magnetic flux generated by the right winding returns to the magnetic cylinder corresponding to the winding after passing through the second magnetic yoke 2 and the adjacent first magnetic yoke, the other part of the magnetic flux generated by the left winding returns to the magnetic cylinder corresponding to the winding after passing through the second magnetic yoke 1 and the adjacent first magnetic yoke. In this case, the two windings are not coupled. This can simplify circuit control logic.

It should be noted that M may be 2, or may be an integer greater than 2. When M is 2, windings in an upper layer of space and a lower layer of space have different inductances, and may be respectively used as a first winding and a second winding. The first winding and the second winding are connected to components in the PFC circuit, so that common-mode noise of the PFC circuit is reduced, and a PCB area occupied by the PFC circuit is reduced. When M is greater than 2, windings in two layers of spaces that meet a requirement in the M layers of spaces of the integrated inductor may be selected as a first winding and a second winding respectively, and are used in the PFC circuit. Windings in other layers of spaces of the integrated inductor may provide redundancy, to provide a plurality of windings with optional inductances when a parameter of the PFC circuit changes. This meets requirements of the PFC circuit in different application scenarios.

Optionally, the M+1 first magnetic yokes may be sequentially arranged along a horizontal direction or another direction. When the M+1 first magnetic yokes are sequentially arranged along the horizontal direction, a structure of the integrated inductor may adaptively change. This is not limited in this application.

In the integrated inductor, there may be an air gap between any magnetic cylinder and two first magnetic yokes adjacent to the magnetic cylinder, and there may be one or more air gaps. In FIG. 13 to FIG. 18, an example in which there is one air gap between a magnetic cylinder and a first magnetic yoke that is adjacent to and located above the magnetic cylinder is used. Actually, there may also be an air gap between the magnetic cylinder and a first magnetic yoke that is adjacent to and located below the magnetic cylinder. There may also be one or more air gaps between magnetic cylinders. This may be specifically set based on an actual requirement. Heights of magnetic cylinders in different layers of spaces may be the same or may be different. Each winding may be wound on a framework and then sleeved on the magnetic cylinder, or may be directly wound on the magnetic cylinder. This is not limited in this application.

In this application, two groups of windings are integrated into a same integrated inductor, the two groups of windings are disposed in two different layers of spaces in the integrated inductor, and an arrangement direction of the two layers of spaces is perpendicular to a surface that is of the PCB and on which the integrated inductor is mounted. This can reduce a board area occupied by the integrated inductor, and reduce a space and costs. In addition, the integrated inductor is connected to the PFC circuit to suppress common-mode noise of the PFC circuit. This helps optimize EMI and improve product power density.

What is claimed is:

1. A power factor correction (PFC) circuit, comprising S first bridge arms, a second bridge arm, a voltage stabilization capacitor, and an integrated inductor, wherein:
- the S first bridge arms, the second bridge arm, and the voltage stabilization capacitor are connected in parallel,
- the integrated inductor comprises a magnetic core, S first windings, and S second windings, wherein:
  - first ends of the S first windings are all configured to connect to a first end of an alternating current power supply,
  - second ends of the S first windings are respectively connected to midpoints of the S first bridge arms, and
  - the S second windings form a balancing unit, wherein a first end of the balancing unit is configured to connect to a second end of the alternating current power supply, and a second end of the balancing unit is connected to a midpoint of the second bridge arm,
  - wherein S is an integer greater than or equal to 1; and
- the magnetic core comprises M+1 first magnetic yokes sequentially arranged in parallel, wherein:
  - the S first windings and the S second windings are respectively disposed in spaces formed by any two adjacent first magnetic yokes of the M+1 first magnetic yokes,
  - two adjacent first magnetic yokes corresponding to a space in which the S first windings are located are the same,
  - two adjacent first magnetic yokes corresponding to a space in which the S second windings are located are the same, and
  - one of the two adjacent first magnetic yokes corresponding to the space in which the S first windings are located is different from the two adjacent first magnetic yokes corresponding to the space in which the S second windings are located,
  - wherein M is an integer greater than or equal to 2.

2. The PFC circuit according to claim 1, wherein:
- each of the S first bridge arms comprises two high-frequency switches connected in series,
- the second bridge arm comprises two low-frequency switches connected in series,
- a switching frequency of at least one of the two high-frequency switches is greater than a frequency of the alternating current power supply, and
- a switching frequency of at least one of the two low-frequency switches is equal to the frequency of the alternating current power supply.

3. The PFC circuit according to claim 1, wherein S is greater than or equal to 2, and the balancing unit comprises the S second windings that are sequentially connected in series.

4. The PFC circuit according to claim 1, wherein inductances of the S first windings are the same, and inductances of the S second windings are the same.

5. The PFC circuit according to claim 1, wherein:
- M is greater than or equal to 3, and the integrated inductor further comprises S third windings, wherein:
  - two adjacent first magnetic yokes corresponding to a space in which the S third windings are located are the same,
  - one of the two adjacent first magnetic yokes corresponding to the space in which the S third windings are located is different from the two adjacent first magnetic yokes corresponding to the space in which the S first windings are located, and
  - one of the two adjacent first magnetic yokes corresponding to the space in which the S third windings are located is different from the two adjacent first magnetic yokes corresponding to the space in which the S second windings are located; and
- a quantity of turns of at least one of the S third windings meets any one of the following:
  - the quantity of turns of at least one of the S third windings is different from a quantity of turns of a first winding;
  - the quantity of turns of at least one of the S third windings is different from a quantity of turns of a second winding; or
  - the quantity of turns of at least one of the S third windings is different from the quantity of turns of a first winding and the quantity of turns of a second winding.

6. The PFC circuit according to claim 1, wherein:
- the magnetic core further comprises M*N magnetic cylinders and P second magnetic yokes arranged in parallel, N is an integer greater than or equal to S, P is an integer greater than or equal to 1, and a difference between N and P is less than or equal to 1;

the P second magnetic yokes are all perpendicular to the M+1 first magnetic yokes, and the P second magnetic yokes are disposed between an initial first magnetic yoke and a last first magnetic yoke of the M+1 first magnetic yokes, and each of the P second magnetic yokes is in communication with the initial first magnetic yoke and the last first magnetic yoke;

N magnetic cylinders are disposed in each layer of space formed by any two adjacent first magnetic yokes of the M+1 first magnetic yokes, wherein:

each of the N magnetic cylinders in each layer of space is in contact with two adjacent first magnetic yokes corresponding to the layer of space, the N magnetic cylinders in each layer of space are all parallel to the P second magnetic yokes, and the N magnetic cylinders in each layer of space and the P second magnetic yokes are alternately arranged; and one winding is disposed on each of the M*N magnetic cylinders.

7. A power factor correction (PFC) circuit, comprising a rectifier unit, S PFC branches, a filter capacitor, and an integrated inductor, wherein:

the integrated inductor comprises a magnetic core, S first windings, and S second windings, wherein:

each of the S PFC branches comprises one first winding in the S first windings, a diode, and a first switch, the diode and the first switch in each PFC branch are connected in series and then connected in parallel to the filter capacitor, a first end of the first winding in each PFC branch is connected to a first output end of the rectifier unit, a second end of the first winding in each PFC branch is connected to a point at which the diode and the first switch in the PFC branch are connected in series, and the S second windings form a balancing unit, wherein a first end of the balancing unit is connected to a second output end of the rectifier unit, and a second end of the balancing unit is connected to a point at which the filter capacitor and the first switch are connected; and the magnetic core comprises M+1 first magnetic yokes sequentially arranged in parallel, wherein:

the S first windings and the S second windings are disposed in spaces formed by any two adjacent first magnetic yokes of the M+1 first magnetic yokes, two adjacent first magnetic yokes corresponding to a space in which the S first windings are located are the same, two adjacent first magnetic yokes corresponding to a space in which the S second windings are located are the same, and one of the two adjacent first magnetic yokes corresponding to the space in which the S first windings are located is different from the two adjacent first magnetic yokes corresponding to the space in which the S second windings are located, wherein M is an integer greater than or equal to 2.

8. The PFC circuit according to claim 7, wherein S is greater than or equal to 2, and the balancing unit comprises the S second windings that are sequentially connected in series.

9. The PFC circuit according to claim 7, wherein inductances of the S first windings are the same, and inductances of the S second windings are the same.

10. The PFC circuit according to claim 7, wherein:

M is greater than or equal to 3, and the integrated inductor further comprises S third windings, wherein:

two adjacent first magnetic yokes corresponding to a space in which the S third windings are located are the same, one of the two adjacent first magnetic yokes corresponding to the space in which the S third windings are located is different from the two adjacent first magnetic yokes corresponding to the space in which the S first windings are located, and one of the two adjacent first magnetic yokes corresponding to the space in which the S third windings are located is different from the two adjacent first magnetic yokes corresponding to the space in which the S second windings are located; and a quantity of turns of at least one of the S third windings meets any one of the following:

the quantity of turns of at least one of the S third windings is different from a quantity of turns of the first winding;

the quantity of turns of at least one of the S third windings is different from a quantity of turns of a second winding; or the quantity of turns of at least one of the S third windings is different from the quantity of turns of a first winding and the quantity of turns of a second winding.

11. The PFC circuit according to claim 7, wherein:

the magnetic core further comprises M*N magnetic cylinders and P second magnetic yokes arranged in parallel, N is an integer greater than or equal to S, P is an integer greater than or equal to 1, and a difference between N and P is less than or equal to 1;

the P second magnetic yokes are all perpendicular to the M+1 first magnetic yokes, and the P second magnetic yokes are disposed between an initial first magnetic yoke and a last first magnetic yoke of the M+1 first magnetic yokes, and each of the P second magnetic yokes is in communication with the initial first magnetic yoke and the last first magnetic yoke;

N magnetic cylinders are disposed in each layer of space formed by any two adjacent first magnetic yokes of the M+1 first magnetic yokes, wherein:

each of the N magnetic cylinders in each layer of space is in contact with two adjacent first magnetic yokes corresponding to the layer of space, the N magnetic cylinders in each layer of space are all parallel to the P second magnetic yokes, and the N magnetic cylinders in each layer of space and the P second magnetic yokes are alternately arranged; and one winding is disposed on each of the M*N magnetic cylinders.

12. A power device, comprising a direct current (DC/DC) converter and the PFC circuit according to claim 7, wherein:

an output end of the PFC circuit is connected to an input end of the DC/DC converter; and the DC/DC converter is configured to perform DC/DC conversion based on a direct current voltage provided by the PFC circuit.

13. A power device, comprising a direct current (DC/DC) converter and a power factor correction (PFC) circuit, wherein:

an output end of the PFC circuit is connected to an input end of the DC/DC converter;

the DC/DC converter is configured to perform DC/DC conversion based on a direct current voltage provided by the PFC circuit;

the PFC circuit comprises S first bridge arms, a second bridge arm, a voltage stabilization capacitor, and an integrated inductor, wherein:

the S first bridge arms, the second bridge arm, and the voltage stabilization capacitor are connected in parallel, the integrated inductor comprises a magnetic core, S first windings, and S second windings, wherein:

first ends of the S first windings are all configured to connect to a first end of an alternating current power supply, second ends of the S first windings are respectively connected to midpoints of the S first bridge arms, and the S second windings form a balancing unit, wherein a first end of the balancing unit is configured to connect to a second end of the alternating current power supply, and a second end of the balancing unit is connected to a midpoint of the second bridge arm, wherein S is an integer greater than or equal to 1; and the magnetic core comprises M+1 first magnetic yokes sequentially arranged in parallel, wherein:

the S first windings and the S second windings are respectively disposed in spaces formed by any two adjacent first magnetic yokes of the M+1 first magnetic yokes, two adjacent first magnetic yokes corresponding to a space in which the S first windings are located are the same, two adjacent first magnetic yokes corresponding to a space in which the S second windings are located are the same, and one of the two adjacent first magnetic yokes corresponding to the space in which the S first windings are located is different from the two adjacent first magnetic yokes corresponding to the space in which the S second windings are located, wherein M is an integer greater than or equal to 2.

14. The power device according to claim 13, wherein:

each of the S first bridge arms comprises two high-frequency switches connected in series, the second bridge arm comprises two low-frequency switches connected in series, a switching frequency of at least one of the two high-frequency switches is greater than a frequency of the alternating current power supply, and a switching frequency of at least one of the two low-frequency switches is equal to the frequency of the alternating current power supply.

15. The power device according to claim 13, wherein S is greater than or equal to 2, and the balancing unit comprises the S second windings that are sequentially connected in series.

16. The power device according to claim 13, wherein inductances of the S first windings are the same, and inductances of the S second windings are the same.

17. The power device according to claim 13, wherein:

M is greater than or equal to 3, and the integrated inductor further comprises S third windings, wherein:

two adjacent first magnetic yokes corresponding to a space in which the S third windings are located are the same, one of the two adjacent first magnetic yokes corresponding to the space in which the S third windings are located is different from the two adjacent first magnetic yokes corresponding to the space in which the S first windings are located, and one of the two adjacent first magnetic yokes corresponding to the space in which the S third windings are located is different from the two adjacent first magnetic yokes corresponding to the space in which the S second windings are located; and a quantity of turns of at least one of the S third windings meets any one of the following:

the quantity of turns of at least one of the S third windings is different from a quantity of turns of a first winding;

the quantity of turns of at least one of the S third windings is different from a quantity of turns of a second winding; or the quantity of turns of at least one of the S third windings is different from the quantity of turns of a first winding and the quantity of turns of a second winding.

18. The power device according to claim 13, wherein:

the magnetic core further comprises M*N magnetic cylinders and P second magnetic yokes arranged in parallel, N is an integer greater than or equal to S, P is an integer greater than or equal to 1, and a difference between N and P is less than or equal to 1;

the P second magnetic yokes are all perpendicular to the M+1 first magnetic yokes, and the P second magnetic yokes are disposed between an initial first magnetic yoke and a last first magnetic yoke of the M+1 first magnetic yokes, and each of the P second magnetic yokes is in communication with the initial first magnetic yoke and the last first magnetic yoke;

N magnetic cylinders are disposed in each layer of space formed by any two adjacent first magnetic yokes of the M+1 first magnetic yokes, wherein:

each of the N magnetic cylinders in each layer of space is in contact with two adjacent first magnetic yokes corresponding to the layer of space, the N magnetic cylinders in each layer of space are all parallel to the P second magnetic yokes, and the N magnetic cylinders in each layer of space and the P second magnetic yokes are alternately arranged; and one winding is disposed on each of the M*N magnetic cylinders.

* * * * *